US012566590B2

(12) United States Patent
Srivastava et al.

(10) Patent No.: US 12,566,590 B2
(45) Date of Patent: Mar. 3, 2026

(54) LOW CODE NO CODE CI/CD PLATFORM

(71) Applicant: SAP SE, Walldorf (DE)

(72) Inventors: Abhinav Srivastava, Gorakhpur (IN);
Krishna Prasad P, Kasaragod (IN);
Anurag Negi, Pauri Garhwal (IN)

(73) Assignee: SAP SE, Walldorf (DE)

( * ) Notice: Subject to any disclaimer, the term of this patent is extended or adjusted under 35 U.S.C. 154(b) by 196 days.

(21) Appl. No.: 17/986,708

(22) Filed: Nov. 14, 2022

(65) Prior Publication Data

US 2024/0160418 A1 May 16, 2024

(51) Int. Cl.
*G06F 8/34* (2018.01)

(52) U.S. Cl.
CPC ...................................... *G06F 8/34* (2013.01)

(58) Field of Classification Search
CPC ..... G06F 8/20; G06F 8/34; G06F 8/36; G06F 9/3867
See application file for complete search history.

(56) References Cited

U.S. PATENT DOCUMENTS

| 2022/0121477 A1* | 4/2022 | Chivukula | ............ | G06F 9/5077 |
| 2022/0300265 A1* | 9/2022 | Purohit | .............. | G06F 11/3688 |
| 2023/0035437 A1* | 2/2023 | Bregman | ............ | G06F 11/3409 |
| 2023/0168996 A1* | 6/2023 | Bregman | ............ | G06F 11/3696 |
| | | | | 717/124 |

* cited by examiner

*Primary Examiner* — Hanh Thi-Minh Bui
(74) *Attorney, Agent, or Firm* — Mintz Levin Cohn Ferris Glovsky and Popeo, P.C.

(57) ABSTRACT

A method for implementing a low code no code continuous integration/continuous delivery (CI/CD) platform includes receiving, by the CI/CD platform, a request to build a CI/CD pipeline for developing a software application. The method includes building, by the CI/CD platform, the CI/CD pipeline by at least: receiving a selection of one or more pre-built stages from a plurality of pre-built stages of the CI/CD pipeline and arranging, via the user interface, the selected one or more pre-built stages. The method also includes executing, by the CI/CD platform, the built CI/CD pipeline to develop the software application by at least: retrieving, from a database in communication with the CI/CD platform, code for each of the arranged one or more pre-built stages. Related systems and articles of manufacture are provided.

15 Claims, 23 Drawing Sheets

1900

```
1    package aif
2
3    class EsLint {
4
5        private final  Script script
6        private def eslintImage
7
8        EsLint() {
9        }
10
11       EsLint(Script script) {
12           this.script = script
13       }
14
15       def init(String dockerImageURI, String dockerfilePath)  {
16           return new aif.ImageFactory(script).execute(dockerImageURI, dockerfilePath)
17       }
18
19       void execute(Boolean pushImageToRegistry=false) throws Exception {
20           try {
21               script.println '--- Running eslint ---'
22               if (pushImageToRegistry) {
23               def dockerImageNameSuffix = script.globalPipelineEnviroment.configuration.DockerImageConfig?.Eslint?.DockerImageName ?: "eslint-image"
24               def dockerfilePath = script.globalPipelineEnvironment.configuration.DockerImageConfig?.Eslint?.DockerfilePath?: "Dockerfile.eslint"
25               def dockerImageURI = "${script.testLandscapeContainerRegistry}/com.sap.ai/${script.applicationName}-${dockerImageSuffix}:${script.application
26                   estlintImage = init(dockerImageURI, dockerfilepath)
27               } else {
28                   def imageName = './Dockerfile.eslint'
29                   eslintImage = script.docker.build("eslint-image:${script.BUILD_ID}", "-f ${imageName} .")
30               }
31
32               eslintImage.inside() {
33                   script.sh '''
34                   make jenkins-eslint
35                   '''
36               }
37           } catch (Exception e) {
38               post()
39               throw e
40           }
41           post()
42       }
43
44       private void post() {
45           script.archiveArtifacts artifacts: '**/src/**/*-lint.xml', fingerprint: true, allowEmptyArchive: true
46           script.recordIssues tool: script.esLint(pattern: '**/src/**/*-lint.xml'), failedTotalHigh: 1, unstableTotalAll: 999, enabledForFailure: true
47       }
48
49   }
```

FIG. 19

Value Stream Mapping
Planning And Design
Build Pipeline
Pipeline Execution
Monitoring Dashboard My First Pipeline V
master V | Re-build

| # | Version | Duration | Status | Test Report | Coverage | Pylint | Hadolint | Whitesource PPMS | Whitesource Vuls | Checkmarx |
|---|---|---|---|---|---|---|---|---|---|---|
| 97 | 1.12.1 | 25m 25s | Pass | Failed: 0 Skipped: 0 Passed: 79 | 0 | High: 0 Medium: 86 Low: 55 | High: NA Medium: NA Low: NA | Total Libs: NA Match Libs: NA | NA | High: 0 Medium: 0 Low: 0 |
| 96 | 1.12.1 | 23m 48s | Fail | Failed: 0 Skipped: 0 Passed: 68 | 0 | High: 0 Medium: 86 Low: 55 | High: NA Medium: NA Low: NA | Total Libs: NA Match Libs: NA | NA | High: NA Medium: NA Low: NA |
| 95 | 1.12.0 | 26m 25s | Pass | Failed: 0 Skipped: 0 Passed: 90 | 0 | High: 0 Medium: 86 Low: 55 | High: NA Medium: NA Low: NA | Total Libs: NA Match Libs: NA | NA | High: 0 Medium: 0 Low: 0 |
| 93 | 1.12.0 | 28m 43s | Pass | Failed: 0 Skipped: 0 Passed: 79 | 0 | High: 0 Medium: 86 Low: 55 | High: NA Medium: NA Low: NA | Total Libs: NA Match Libs: NA | NA | High: 0 Medium: 0 Low: 0 |
| 91 | 1.11.0 | 24m 3s | Pass | Failed: 0 Skipped: 0 Passed: 79 | 0 | High: 0 Medium: 86 Low: 55 | High: NA Medium: NA Low: NA | Total Libs: NA Match Libs: NA | NA | High: 0 Medium: 0 Low: 0 |
| 89 | 1.10.6 | 25m 38s | Pass | Failed: 0 Skipped: 0 Passed: 78 | 0 | High: 0 Medium: 88 Low: 55 | High: NA Medium: NA Low: NA | Total Libs: NA Match Libs: NA | NA | High: 0 Medium: 0 Low: 1 |
| 87 | 1.10.5 | 23m 39s | Pass | Failed: 0 Skipped: 0 Passed: 78 | 0 | High: 0 Medium: 91 Low: 55 | High: NA Medium: NA Low: NA | Total Libs: NA Match Libs: NA | NA | High: 0 Medium: 0 Low: 1 |
| 85 | 1.10.4 | 24m 20s | Pass | Failed: 0 Skipped: 0 Passed: 79 | 0 | High: 0 Medium: 89 Low: 55 | High: NA Medium: NA Low: NA | Total Libs: NA Match Libs: NA | NA | High: 0 Medium: 0 Low: 1 |
| 83 | 1.10.3 | 25m 7s | Pass | Failed: 0 Skipped: 0 Passed: 79 | 0 | High: 0 Medium: 89 Low: 55 | High: NA Medium: NA Low: NA | Total Libs: NA Match Libs: NA | NA | High: 0 Medium: 0 Low: 1 |
| 81 | 1.10.2 | 23m 19s | Pass | Failed: 0 Skipped: 0 Passed: 79 | 0 | High: 0 Medium: 107 Low: 67 | High: NA Medium: NA Low: NA | Total Libs: NA Match Libs: NA | NA | High: 0 Medium: 0 Low: 1 |

Figure 21:
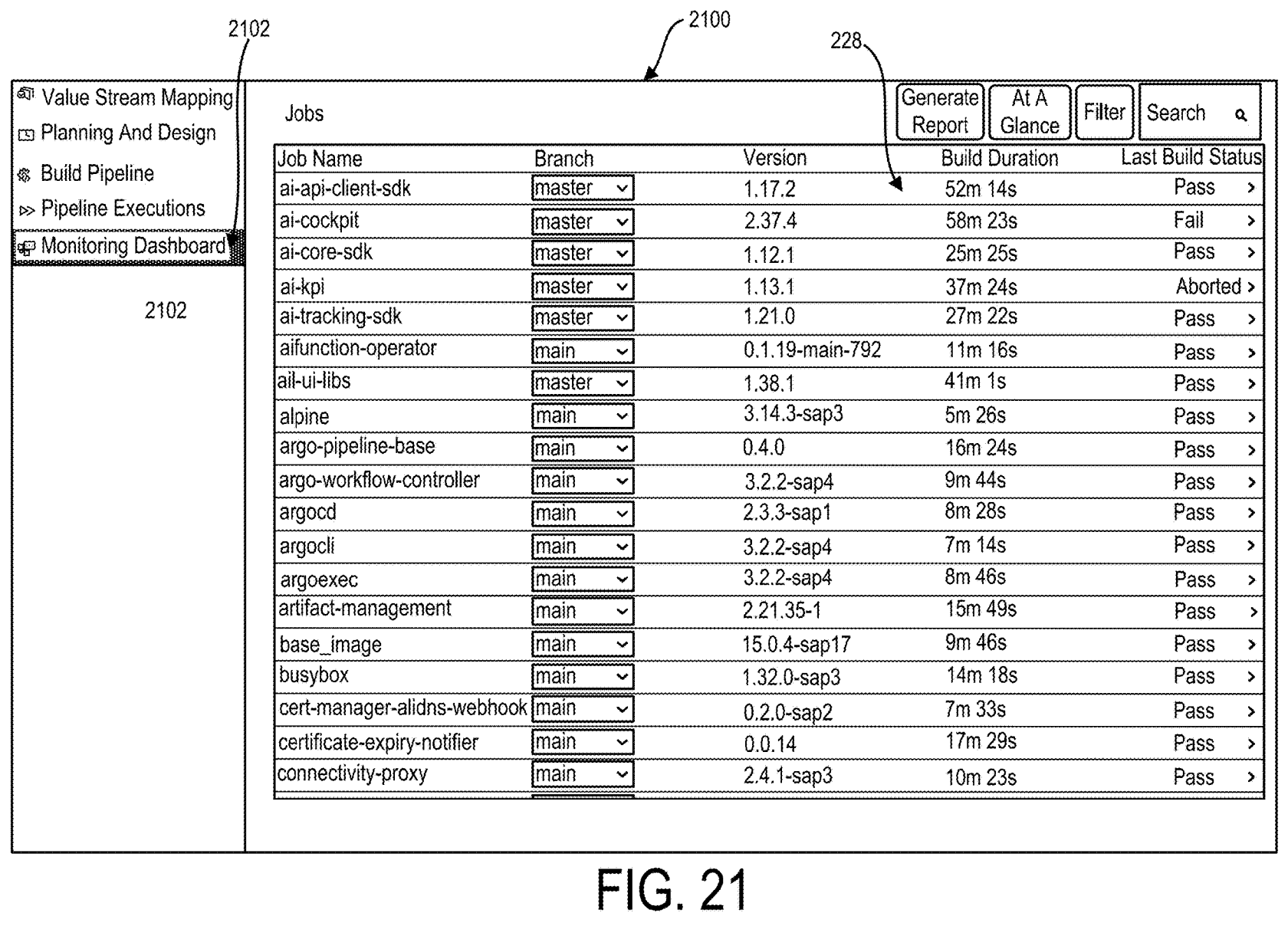

Value Stream Mapping
Planning And Design
Build Pipeline
Pipeline Executions
Monitoring Dashboard

2102

Jobs

Generate Report | At A Glance | Filter | Search

228

| Job Name | Branch | Version | Build Duration | Last Build Status |
|---|---|---|---|---|
| ai-api-client-sdk | master | 1.17.2 | 52m 14s | Pass |
| ai-cockpit | master | 2.37.4 | 58m 23s | Fail |
| ai-core-sdk | master | 1.12.1 | 25m 25s | Pass |
| ai-kpi | master | 1.13.1 | 37m 24s | Aborted |
| ai-tracking-sdk | master | 1.21.0 | 27m 22s | Pass |
| aifunction-operator | main | 0.1.19-main-792 | 11m 16s | Pass |
| ail-ui-libs | master | 1.38.1 | 41m 1s | Pass |
| alpine | main | 3.14.3-sap3 | 5m 26s | Pass |
| argo-pipeline-base | main | 0.4.0 | 16m 24s | Pass |
| argo-workflow-controller | main | 3.2.2-sap4 | 9m 44s | Pass |
| argocd | main | 2.3.3-sap1 | 8m 28s | Pass |
| argocli | main | 3.2.2-sap4 | 7m 14s | Pass |
| argoexec | main | 3.2.2-sap4 | 8m 46s | Pass |
| artifact-management | main | 2.21.35-1 | 15m 49s | Pass |
| base_image | main | 15.0.4-sap17 | 9m 46s | Pass |
| busybox | main | 1.32.0-sap3 | 14m 18s | Pass |
| cert-manager-alidns-webhook | main | 0.2.0-sap2 | 7m 33s | Pass |
| certificate-expiry-notifier | main | 0.0.14 | 17m 29s | Pass |
| connectivity-proxy | main | 2.4.1-sap3 | 10m 23s | Pass |

LOW CODE NO CODE CI/CD PLATFORM

TECHNICAL FIELD

The subject matter described herein relates generally to building continuous integration/continuous delivery pipelines and more specifically to a low code no code continuous integration/continuous delivery platform.

BACKGROUND

Continuous integration and/or continuous delivery (CI/CD) drives software development through building, testing, and deploying code. In continuous integration, code changes are generally merged in a central repository. Each change in code triggers a build-and-test sequence for the given project, providing feedback to developers in building the code. Continuous delivery includes infrastructure provisioning and deployment, which may include multiple stages.

SUMMARY

Systems, methods, and articles of manufacture, including computer program products, are provided for a low code no code continuous integration/continuous delivery platform. In one aspect, there is provided a system. The system may include at least one data processor and at least one memory. The at least one memory may store instructions that result in operations when executed by the at least one data processor. The operations may include: receiving, by an integration and delivery platform via a user interface displayed at a client device, a request to build an integration and delivery pipeline for developing a software application. The request includes one or more input values for the integration and delivery pipeline. The operations may also include building, by the integration and delivery platform, the integration and delivery pipeline by at least: receiving, via the user interface, a selection of one or more pre-built stages from a plurality of pre-built stages of the integration and delivery pipeline, and arranging, via the user interface, the selected one or more pre-built stages. The operations may also include executing, by the integration and delivery platform and based on the one or more input values and the arranged one or more pre-built stages, the built integration and delivery pipeline to develop the software application by at least: retrieving, from a database in communication with the integration and delivery platform, code for each of the arranged one or more pre-built stages.

In some variations, the operations further include: generating, by the integration and delivery platform and based on the arranged one or more pre-built stages, a recommendation for re-arranging the selected one or more pre-built stages for improving the integration and delivery pipeline.

In some variations, the arranging includes receiving, via the user interface, a user input causing the selected one or more pre-built stages to be dragged from a first portion of the user interface to a second portion of the user interface.

In some variations, the arranging further includes: adding one or more pre-built stages from the first portion to the second portion of the user interface, reordering the one or more pre-built stages at the second portion of the user interface, configuring a property of the selected one or more pre-built stages, and/or removing the one or more pre-built stages from the second portion of the user interface.

In some variations, the built integration and delivery pipeline is further executed by at least: providing the one or more input values to the code for each of the arranged one or more pre-built stages.

In some variations, the operations further include: testing, by the integration and delivery platform, the software application based on the arranged one or more pre-built stages of the integration and delivery pipeline. The operations may also include generating, by the integration and delivery platform, a first visual representation of a status of the testing of each of the arranged one or more pre-built stages of the integration and delivery pipeline. The operations may also include generating, by the integration and delivery platform, a second visual representation of the development of the software application.

In some variations, the operations further include: receiving, by the integration and delivery platform, selection of a value stream mapping template for development of the software application. The operations may also include generating, by the integration and delivery platform, a value stream mapping based at least on the selected value stream mapping template and the one or more input values. The value stream mapping indicates a timeline for developing the software application.

In some variations, the operations further include: receiving, by the integration and delivery platform, an image of an architecture representing at least a portion of the software application. The operations may also include generating, by the integration and delivery platform and based on based on the image, an architecture diagram representing the architecture for display via the client device.

In some variations, a computer-implemented method includes: receiving, by an integration and delivery platform via a user interface displayed at a client device, a request to build an integration and delivery pipeline for developing a software application. The request includes one or more input values for the integration and delivery pipeline. The method includes building, by the integration and delivery platform, the integration and delivery pipeline by at least: receiving, via the user interface, a selection of one or more pre-built stages from a plurality of pre-built stages of the integration and delivery pipeline, and arranging, via the user interface, the selected one or more pre-built stages. The method further includes executing, by the integration and delivery platform and based on the one or more input values and the arranged one or more pre-built stages, the built integration and delivery pipeline to develop the software application by at least: retrieving, from a database in communication with the integration and delivery platform, code for each of the arranged one or more pre-built stages.

In some variations, a non-transitory computer-readable medium storing instructions, which when executed by at least one data processor, result in operations including: receiving, by an integration and delivery platform via a user interface displayed at a client device, a request to build an integration and delivery pipeline for developing a software application. The request includes one or more input values for the integration and delivery pipeline. The operations further include building, by the integration and delivery platform, the integration and delivery pipeline by at least: receiving, via the user interface, a selection of one or more pre-built stages from a plurality of pre-built stages of the integration and delivery pipeline, and arranging, via the user interface, the selected one or more pre-built stages. The operations further include executing, by the integration and delivery platform and based on the one or more input values and the arranged one or more pre-built stages, the built integration and delivery pipeline to develop the software application by at least: retrieving, from a database in communication with the integration and delivery platform, code for each of the arranged one or more pre-built stages.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 19 depicts an example portion of code of a continuous integration pipeline, in accordance with some example embodiments;

FIG. 20 depicts an example user interface for continuous integration/continuous delivery pipeline execution using a continuous integration/continuous delivery platform, in accordance with some example embodiments;

FIG. 21 depicts an example user interface for continuous integration/continuous delivery pipeline monitoring using a continuous integration/continuous delivery platform, in accordance with some example embodiments;

When practical, similar reference numbers denote similar structures, features, or elements.

DETAILED DESCRIPTION

Figure 1:
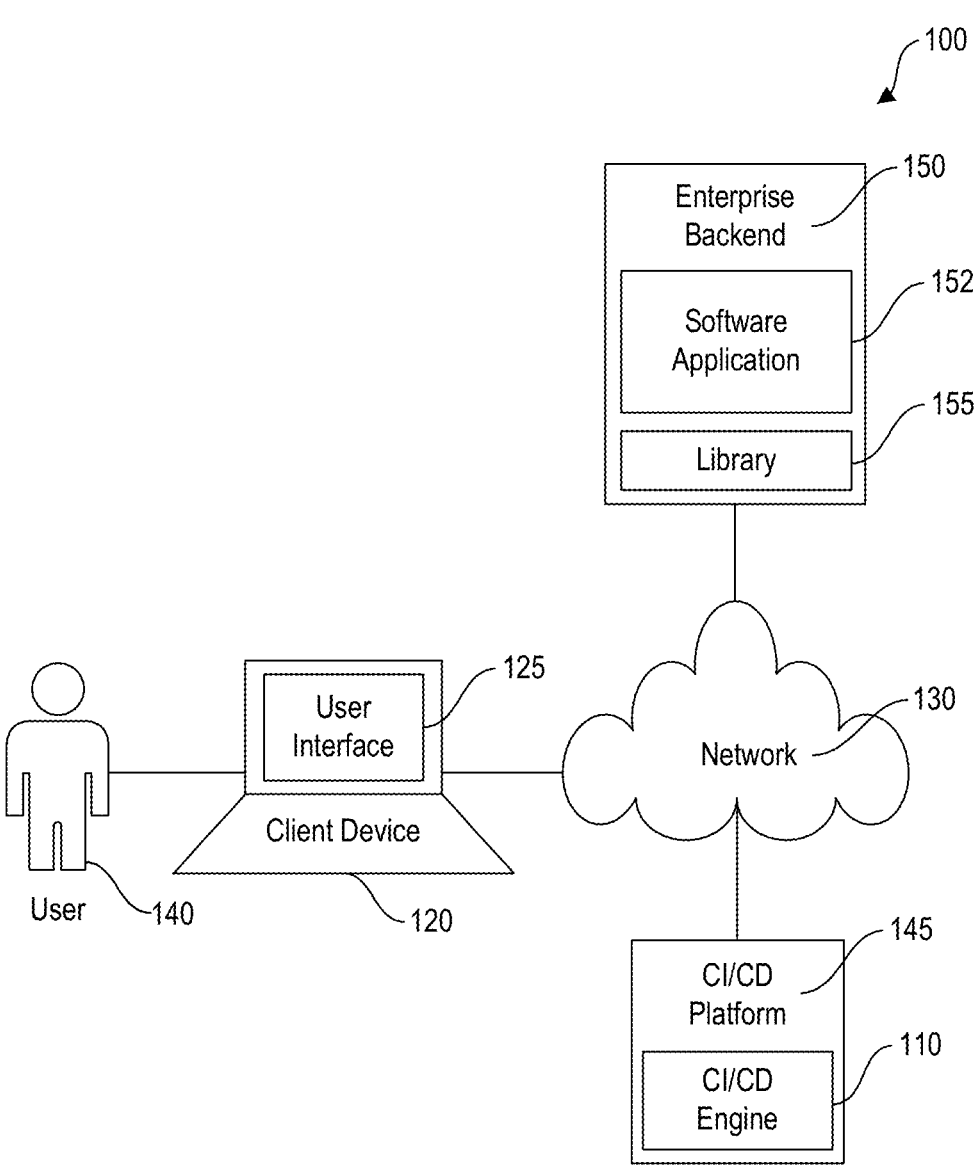
FIG. 1 depicts a system diagram illustrating a continuous integration/continuous delivery system, in accordance with some example embodiments.

Delivering software applications, such as cloud products, to customers more frequently and quickly is highly demanded by the growing large-scale cloud transition to maximize value. To deliver such software applications quickly and more frequently, software applications may follow a continuous integration (CI) paradigm for building, testing, and deploying code. Changes to the code can be verified using continuous integration tooling. For example, in continuous integration, code changes are merged in a central repository. Each change in code may trigger a build-and-test sequence for the given project, providing feedback to developers in building the code. Continuous delivery (CD) includes infrastructure provisioning and deployment, which may include multiple stages.

Continuous integration servers, such as Jenkins, Azure, and/or the like, can be used when building and testing the code for the application. A continuous integration pipeline may be used to configure the continuous integration servers. Continuous integration pipelines include code for processes that run in the background and test all aspects of a product during building and/or prior to deployment. However, continuous integration tools used for generating and executing the continuous integration pipelines to configure continuous integration servers are generally very costly (e.g., computationally and time-intensive), are often disjointed, and/or the like.

Further, implementation of CI/CD pipelines is generally associated with using a variety of tools to carry out various activities throughout the entire software application development lifecycle, and, since each software application adopts DevOps practices to use a continuous delivery model, a large-scale DevOps transformation presents challenges in planning, designing, architecting, and/or the like. For example, complex large-scale microservices architecture transformation uses various independent tools (e.g., continuous integration tools) for planning, architecture design, solution design, CI/CD pipeline execution, CI/CD pipeline monitoring, and/or the like, with limited ability to communicate between tools or monitor the overall status of the software application development. Making the progress transparent for all stakeholders during this process can frequently be difficult, time-consuming, and dependent on a variety of various technologies.

Aside from the complexity of the DevOps process, creating CI/CD pipelines can be considerably more difficult, since such processes involve the creation of large codebases and again, generally do not allow for visibility into the overall status and/or progress. Accordingly, large-scale DevOps transformations can be complex, and be computationally expensive based on the high memory usage and network resource consumption of continuous integration tools and servers and the time to build and monitor software application development using CI/CD pipelines. Thus, deploying continuous integration tools to configure continuous integration servers and modify code of the underlying continuous integration pipeline may be computationally expensive and inefficient.

In contrast, the CI/CD system, consistent with embodiments of the current subject matter, provides a single CI/CD platform that provides an end-to-end view of software application development. For example, the CI/CD platform is a central, all-inclusive platform that implements no code low code DevOps capabilities, such as value stream mapping, planning, architecture design, CI/CD pipeline design, CI/CD pipeline execution, and CI/CD pipeline monitoring. The CI/CD platform may additionally and/or alternatively include integrated continuous integration tools to automatically create backlog items and provide automatic notifications. Thus, the CI/CD system, consistent with embodiments of the current subject matter, increases transparency to the stakeholders of the software application development, and is computationally inexpensive, efficient, highly extendable, and/or highly configurable. The CI/CD system described herein may additionally and/or alternatively reduce the amount of time to modify the code of the continuous integration pipeline for testing an application or product, such as a cloud product prior to deployment and/or reduce memory consumption for testing or modifying the code. The CI/CD system described herein may additionally and/or alternatively be continuous integration tool-agnostic and/or integrate one or more CI/CD tools, improving the extendibility of the CI/CD system.

In particular, the CI/CD system described herein may implement a low code no code CI/CD platform. The CI/CD platform may receive a request, including one or more input values, to build a CI/CD pipeline for developing a software application. The CI/CD platform may build the CI/CD pipeline by at least: receiving a selection of one or more pre-built stages from a plurality of pre-built stages of the CI/CD pipeline, and arranging the selected one or more pre-built stages. Further, the CI/CD platform may execute the built CI/CD pipeline, based on the one or more input values and the arranged one or more pre-built stages, to develop the software application by at least retrieving, from a database in communication with the CI/CD platform, code for each of the arranged one or more pre-built stages. The CI/CD platform may additionally and/or alternatively generate recommendations for improving the arrangement of the one or more pre-built stages in building the CI/CD platform. Accordingly, the CI/CD platform provides a no code low code implementation of CI/CD pipeline development. The CI/CD platform may additionally and/or alternatively provide a single platform for end to end DevOps lifecycle capabilities, including planning, architecture design, CI/CD pipeline generation, CI/CD pipeline execution, and CI/CD pipeline monitoring.

FIG. 1 depicts a network diagram illustrating a CI/CD system 100, in accordance with some example embodiments. Referring to FIG. 1, the CI/CD system 100 may include a CI/CD platform 145, a client device 120, an enterprise backend 150. The CI/CD platform 145, the client device 120, and the enterprise backend 150 may be communicatively coupled via a network 130. The network 130 may be any wired network and/or a wireless network including, for example, a wide area network (WAN), a local area network (LAN), a virtual local area network (VLAN), a public land mobile network (PLMN), the Internet, and/or the like. Although the CI/CD system 100 is shown as a remote and/or cloud platform, it should be appreciated that the CI/CD system 100 may additionally or alternatively be deployed as computer software and/or dedicated circuitry (e.g., application specific integrated circuits (ASICs)) on the client device without departing from the scope of the present disclosure.

The enterprise backend 150 may host one or more software applications 152 and a library 155. The one or more software applications 152 may include a mobile and/or web application, an application service, a cloud service, and/or the like. As described in more detail below, the library 155 may store executable code corresponding to one or more pre-built stages of a CI/CD pipeline.

The client device 120 may be a processor-based device including, for example, a smartphone, a tablet computer, a wearable apparatus, a virtual assistant, an Internet-of-Things (IoT) appliance, and/or the like. The client device 120 includes a user interface 125 that may be manipulated by a user 140. For example, the client device 120 may receive one or more user inputs (e.g., one or more input values, one or more selections, and/or the like) via the user interface 125, as described in more detail below. In accordance with some example embodiments, the user interface 125 may include any one of the user interfaces described herein, such as a user interface 300, 400, 500, 600, 700, 800, 900, 1000, 1300, 1400, 1500, 1600, 1700, 2000, 2100 (described in more detail below).

The CI/CD platform 145 may provide an end to end solution for developing the one or more software applications 152. The CI/CD platform 145 may be a SAAS platform integrated with DevOps planning, processes, and toolchain with capabilities of DevOps transformation planning using value stream mapping version-controlled templates, architecture design, CI/CD pipeline creation, CI/CD pipeline execution, CI/CD monitoring, and/or the like. Accordingly, the CI/CD platform 145 may be used to build, test, and/or deploy code for the one or more software applications 152. The CI/CD platform 145 may be in communication, such as via the network 130, with the client devices 120.

The CI/CD platform 145 includes a CI/CD engine 110. The CI/CD engine 110 may include at least one processor and/or at least one memory storing instructions configured to be executed by the at least one processor. The CI/CD engine 110 may execute or otherwise implement one or more aspects of the CI/CD platform 145, consistent with embodiments of the current subject matter. For example, the CI/CD engine 110 may perform one or more operations of the value stream mapping, the planning, the architecture design, the CI/CD pipeline creation, the CI/CD pipeline execution, the CI/CD pipeline monitoring, and/or the like. The CI/CD engine 110 may thus support the development of the one or more software applications 152. The CI/CD engine 110 may receive one or more user inputs (e.g., a selection, one or more input values, and/or the like) via the user interface 125 of the client device 120, to perform various tasks associated with developing the one or more software applications 152 including, for example, value stream mapping, planning, and/or architecture design for the one or more software applications 152.

Additionally and/or alternatively, the CI/CD engine 110 may, based on the one or more user inputs, perform various tasks associated with CI/CD pipeline generation, execution, and/or monitoring. Consistent with embodiments of the current subject matter, CI/CD pipelines include a plurality of stages for building, testing, and deploying code for the one or more software applications 152. The plurality of stages can be executed by the CI/CD engine 110 in series and/or in parallel depending on the arrangement of the plurality of stages. The plurality of stages may define a plurality of processes including code or logic for execution.

Generally, building and arranging the plurality of stages involves the development of a significant amount of code for such processes that run in the background and test all aspects of a product during building and/or prior to deployment. Such building and arranging processes can be computationally expensive, inefficient, and take a significant amount of time. The CI/CD platform 145 including the CI/CD engine 110 described herein may improve the creation of the CI/CD pipeline for building, testing, and/or deploying the one or more software applications 152. For example, in some embodiments, the CI/CD engine 110 may implement a low code or no code approach to the creation of the CI/CD pipeline. Accordingly, the CI/CD engine 110 may support the creation of the CI/CD pipeline with minimal requirement for coding.

For example, the user interface 125 associated with the CI/CD pipeline may be an interactive user interface in which a custom CI/CD pipeline is created based on one or more inputs (e.g., selections, input values, etc.) from the user 140 at the client device 120. The one or more inputs from the user 140 may configure the CI/CD pipeline. For example, the one or more inputs may include a selection of one or more pre-built stages for the CI/CD pipeline and an arrangement of the selected one or more pre-built stages of the CI/CD pipeline. In other words, the one or more inputs may include dragging and dropping the one or more pre-built stages into an arrangement to build the CI/CD pipeline, with minimal coding requirements. As described in more detail below, code corresponding to each of the one or more pre-built stages can be stored in the library 155 of the enterprise backend 150.

As noted herein, the one or more pre-built stages may, once arranged, be executed and/or monitored by the CI/CD engine 110 by, for example, retrieving the code stored in the library 155 corresponding to the selected one or more pre-built stages, and executing the retrieved code according to the arrangement. Thus, the CI/CD engine 110 may support building and execution of the CI/CD pipeline with minimal requirements for coding on the part of the user 140. Execution of the retrieved code for the one or more pre-built stages may additionally and/or alternatively be based on one or more input values of the one or more user inputs. For example, the one or more input values may be provided by the user 140 associated with the client device 120 prior to and/or during execution of the built CI/CD pipeline. User input, such as those providing the one or more input values, may be solicited through a form. As such, in some example embodiments, the CI/CD engine 110 may also support the creation of forms graphically, for example, through the user interface 125, with minimal requirement for coding on the part of the user 140.

Figure 2:
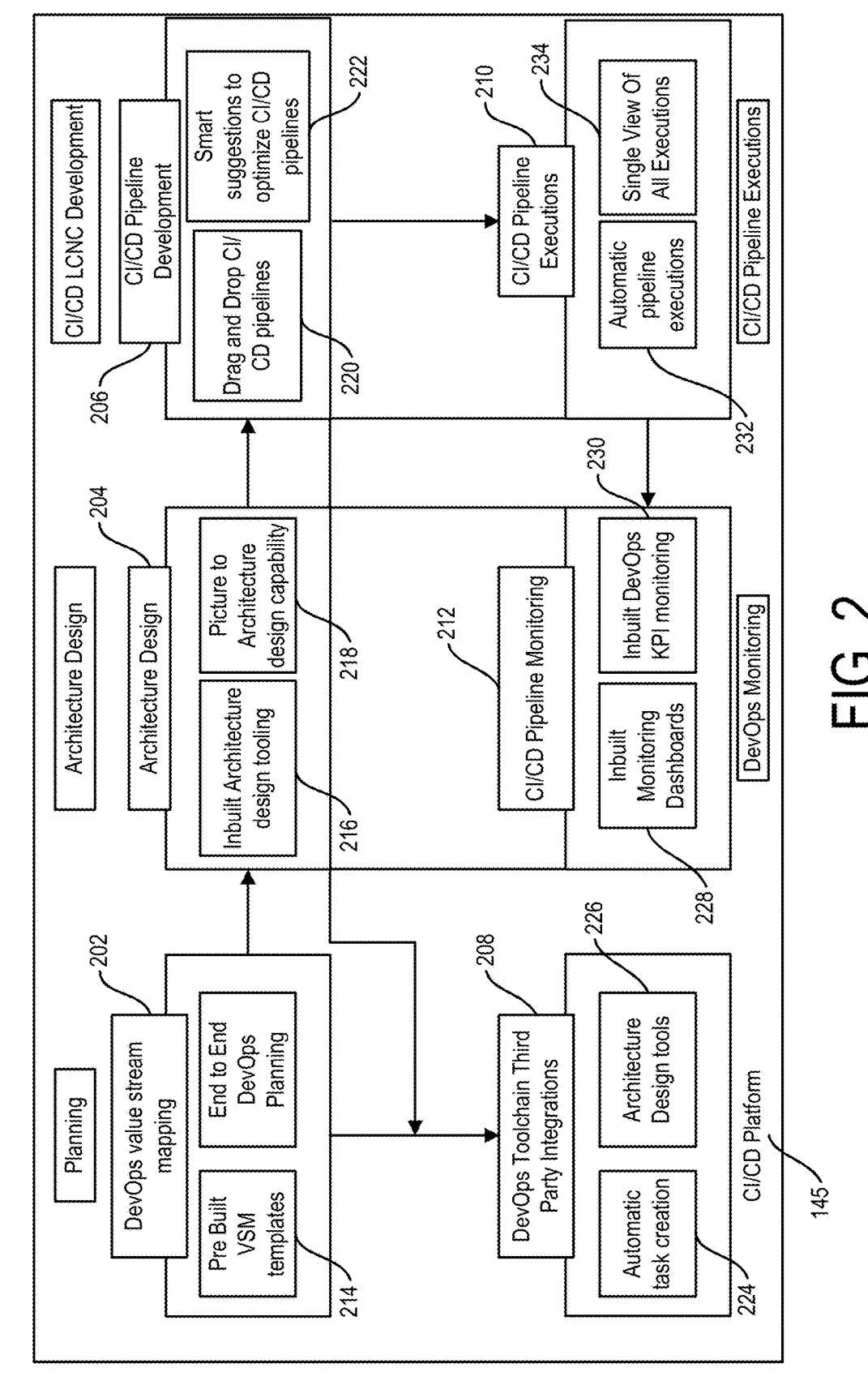
FIG. 2 depicts a block diagram illustrating an example implementation of the continuous integration/continuous delivery system, in accordance with some example embodiments.

FIG. 2 depicts a block diagram illustrating an example schematic diagram 200 including a workflow for the CI/CD platform 145 of the CI/CD system 100, in accordance with some example embodiments. As shown in the diagram 200, the workflow for the CI/CD platform 145 includes value stream mapping 202, architecture design 204, DevOps toolchain third party integrations 208, CI/CD pipeline development 206, CI/CD pipeline execution 210, CI/CD pipeline monitoring 212, and/or the like. Thus, as shown in the diagram 200, the CI/CD platform 145 may be an all-inclusive low code no code DevOps platform that provides end to end DevOps lifecycle capabilities, such as planning (e.g., the value stream mapping 202), architecture design (e.g., the architecture design 204), CI/CD low code no code development (e.g., the CI/CD pipeline development 206), CI/CD pipeline executions (e.g., the CI/CD pipeline execution 210), DevOps monitoring (e.g., the CI/CD pipeline monitoring 212), and tool integrations (e.g., the DevOps toolchain third party integrations 208).

Referring to FIG. 2, the CI/CD platform 145 includes the value stream mapping 202, which may be executed, at least in part, by the CI/CD engine 110. For example, to identify bottlenecks and other inefficiencies in a development process of the one or more software applications 152, and to improve the development process, the CI/CD platform 145 integrates value stream mapping templates 214 that may be used to create a value stream map. Doing so maps the stakeholders from all areas of the software development value stream, including a business line, testing, quality assurance, operations, and support. For example, the created value stream map shows the end to end mapping, including the phases of the development of the software application. The value stream map may, in some embodiments, show a cost for performing each phase. For example, the value stream map may show an expected amount of time (e.g., a predetermined time, a predicted time, and/or the like) corresponding to each phase of the development of the software application, a total amount of time, and/or the like. Additionally and/or alternatively, the value stream map shows the stakeholders involved in each stage and/or process. As noted, this allows for identification (e.g., by the CI/CD engine 110) of bottlenecks within the end to end software application development process. As a result, the development process can be modified and/or improved.

Figure 3:
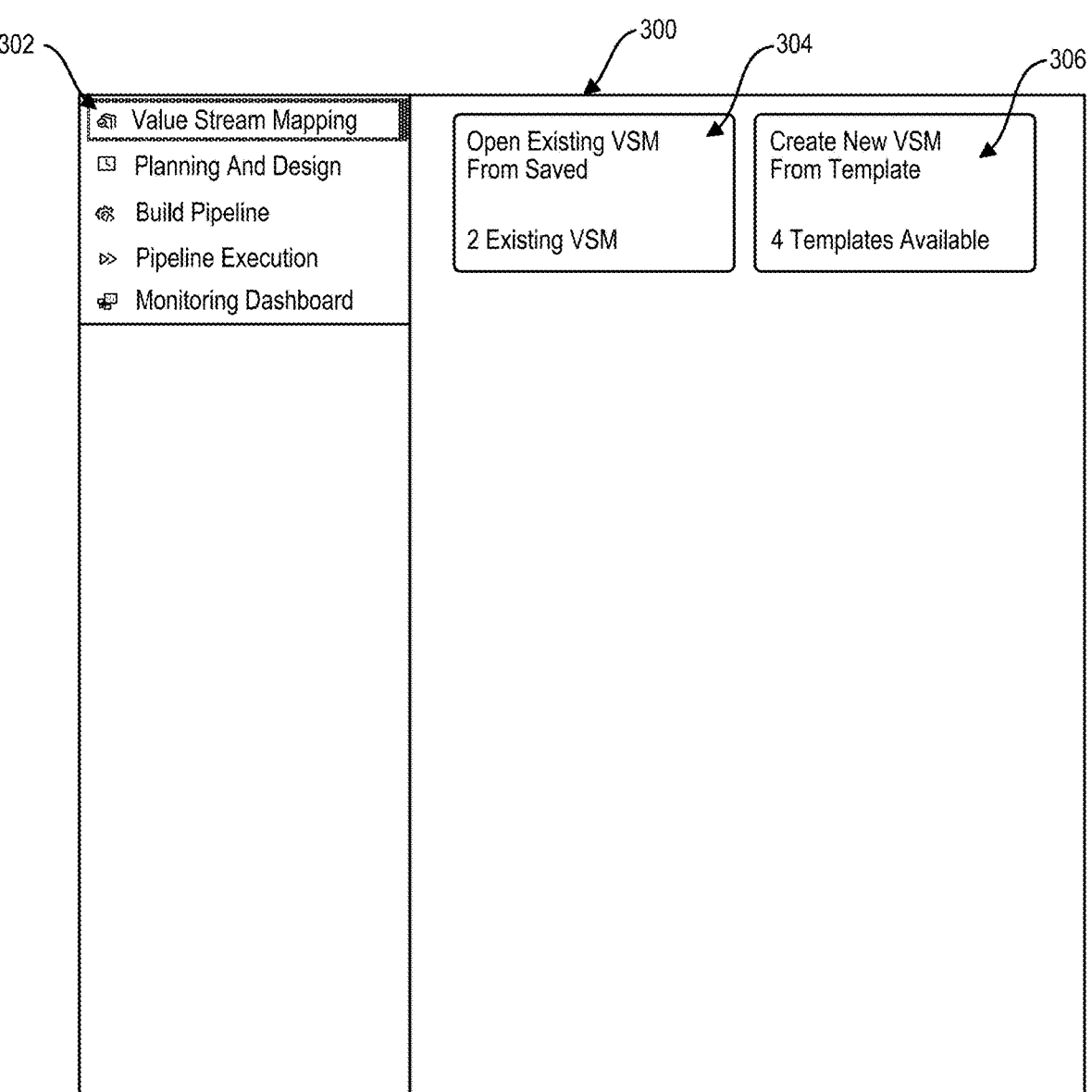
FIG. 3 depicts an example user interface for value stream mapping using a continuous integration/continuous delivery platform, in accordance with some example embodiments.

The value stream mapping templates 214 include one or more value stream mapping templates. The value stream mapping templates 214 may be stored at the enterprise backend 150. The value stream mapping templates 214 may be presented to the user 140, such as via the user interface 125 of the client device 120. FIG. 3 depicts an example user interface 300, in accordance with example embodiments, that may be displayed at the client device 120. As shown in FIG. 3, value stream mapping can be selected by the user 140 at 302. The user interface 300 includes a first option 304 to open an existing value stream map and a second option 306 to create a new value stream map based on a value stream mapping template 212. The existing value stream map and/or the value stream mapping template 212 may be stored at the enterprise backend 150.

Figure 4:
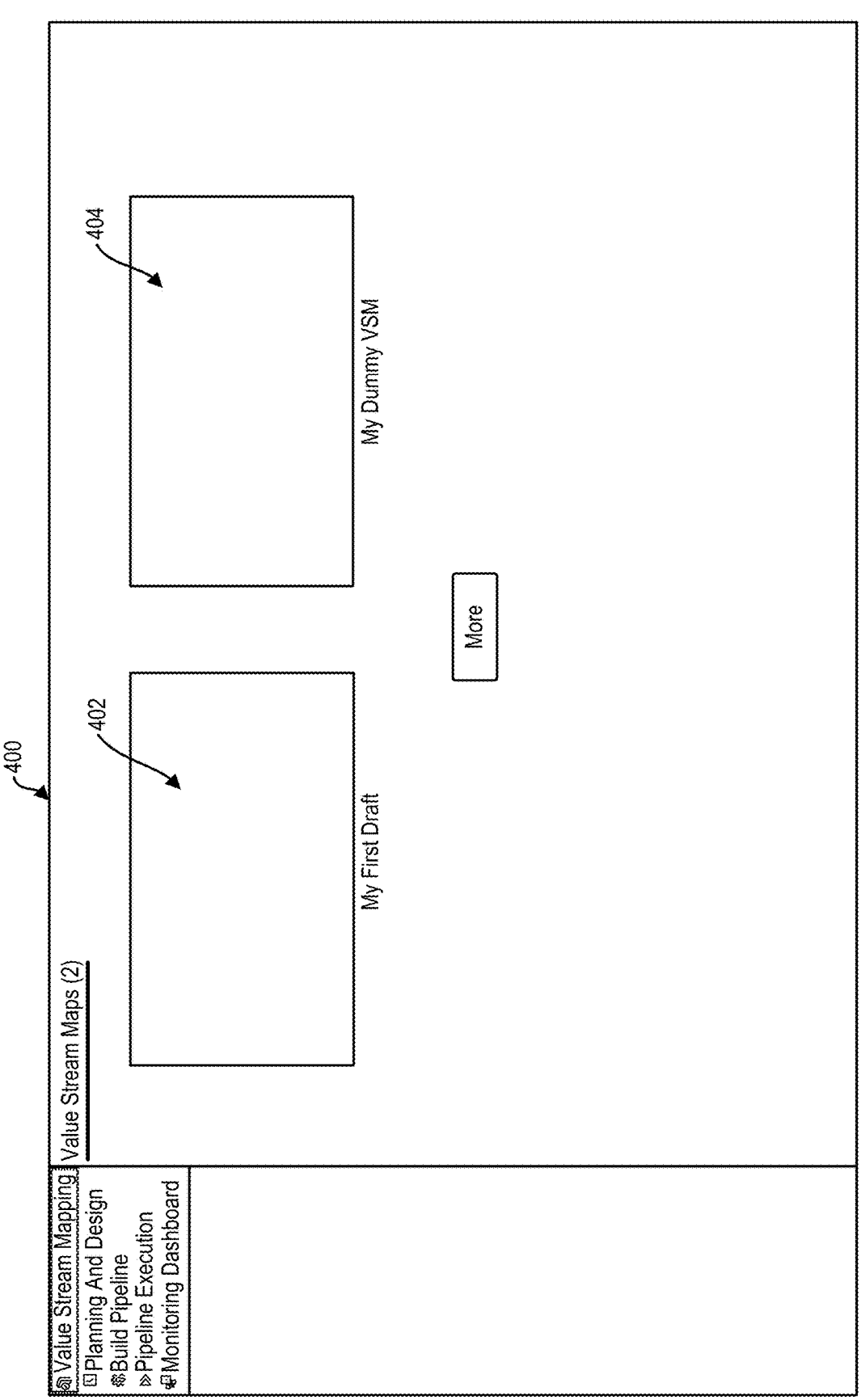
FIG. 4 depicts an example user interface for value stream mapping using a continuous integration/continuous delivery platform, in accordance with some example embodiments.

The first option 304 and the second option 306 may be selected by the user 140. As an example, the saved value stream map may be selected by the user 140 via a user interaction with the first option 304 within the user interface 300 at the client device 120. Based at least upon detection (e.g., by the CI/CD engine 110) of the selection, a user interface 400 (see FIG. 4) may be displayed via the client device 120. As shown in FIG. 4, the user interface 400 includes two examples of previously created and saved value stream maps 402, 404, although other value stream maps may be saved and presented to the user 140.

Figure 5:
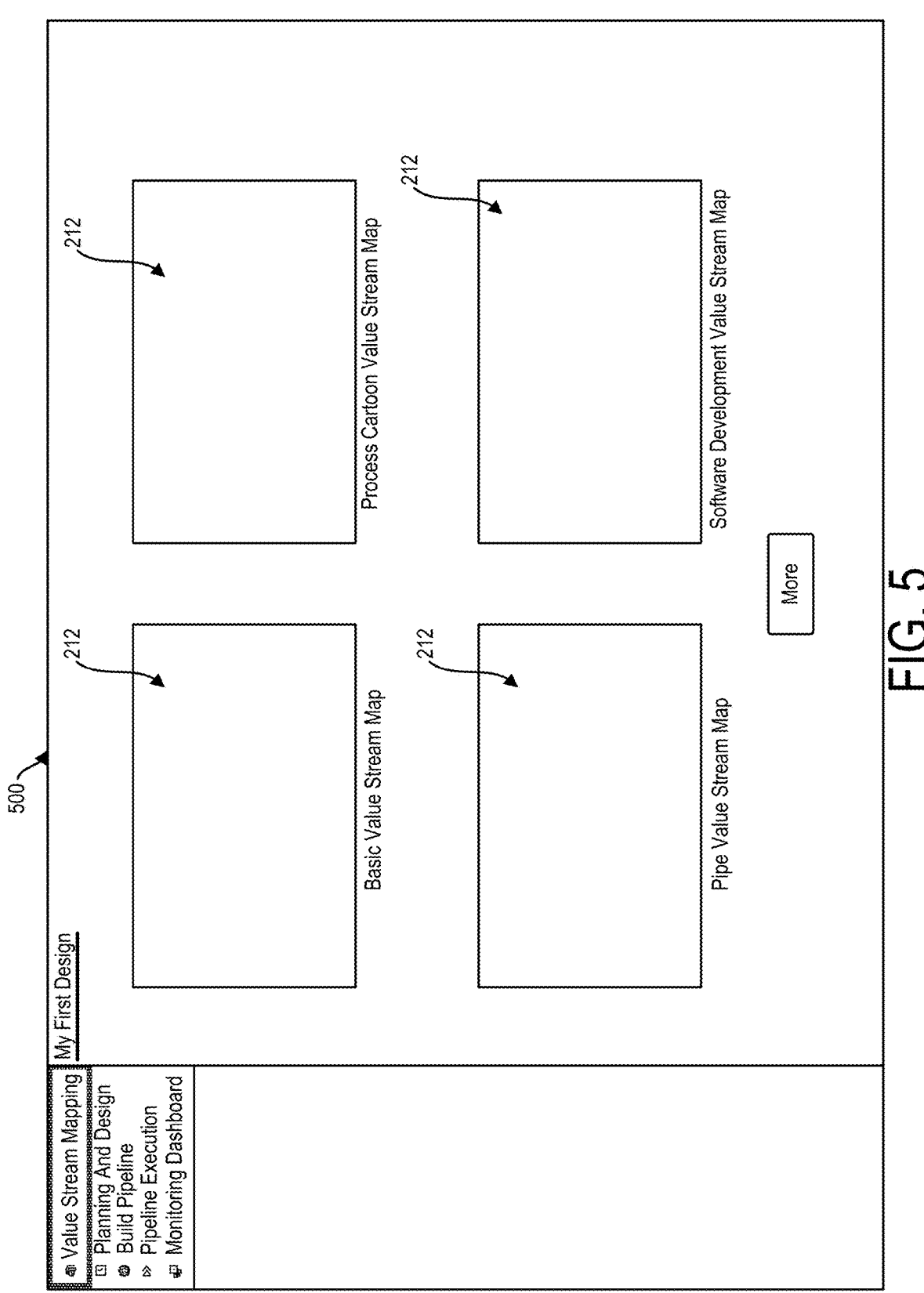
FIG. 5 depicts an example user interface for value stream mapping using a continuous integration/continuous delivery platform, in accordance with some example embodiments.
Figure 6:
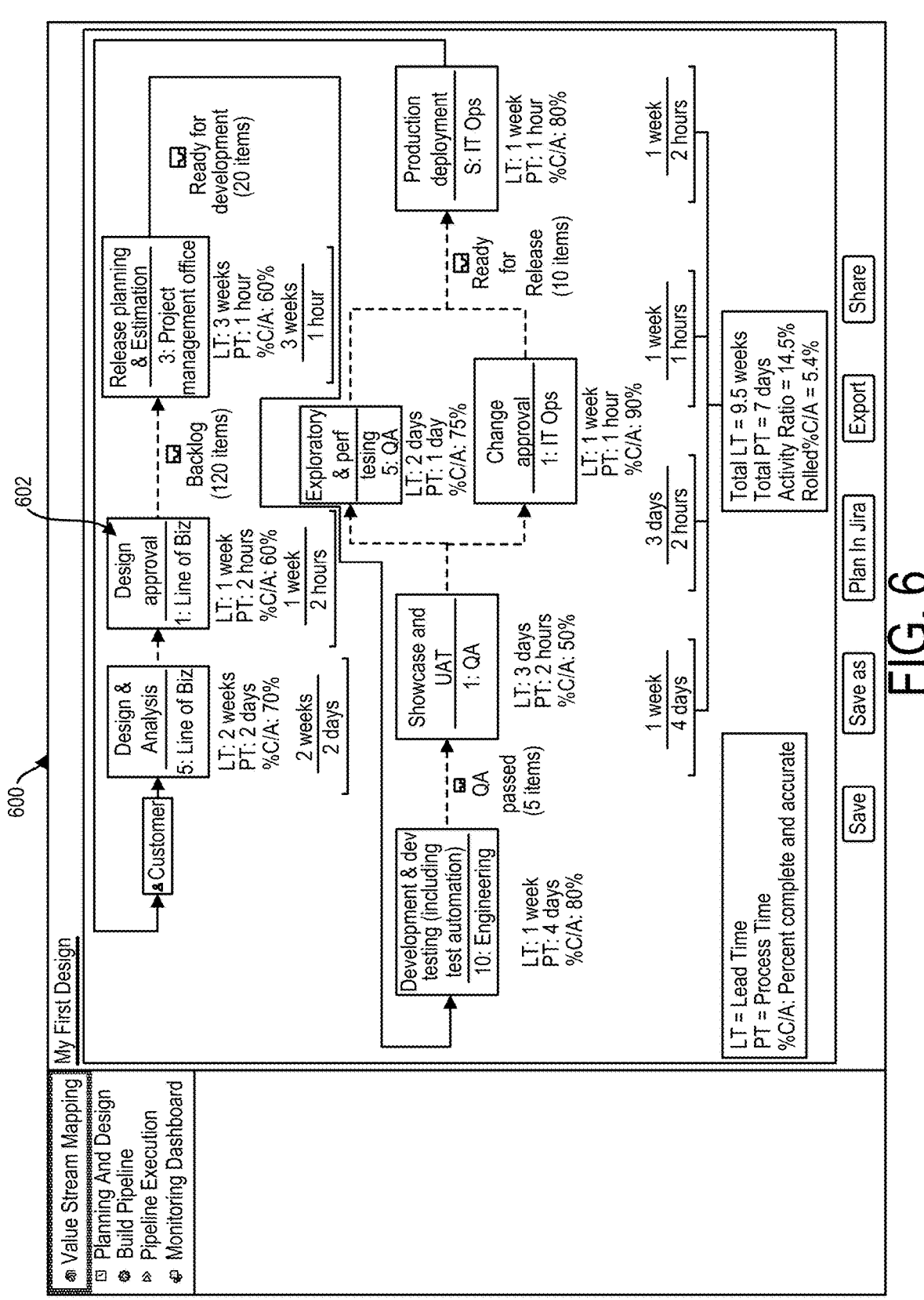
FIG. 6 depicts an example user interface for value stream mapping using a continuous integration/continuous delivery platform, in accordance with some example embodiments.

As another example, the value stream mapping templates 214 may be selected by the user 140 via a user interaction with the second option 306 within the user interface 300 at the client device 120. FIG. 5 depicts an example user interface 500 including example value stream mapping templates 214. As noted, the value stream mapping templates 214 may include one or more pre-built value stream maps that can be customized by the user 140, such as via the user interface 125. The value stream mapping templates 214 may be used generate a value stream map for a particular product (e.g., the one or more software applications 152). The value stream map may indicate a timeline for developing the software application. As an example, FIG. 6 depicts a user interface 600 including an example value stream map 602 generated based at least one the selected value stream mapping template 212 and one or more input values, such as one or more input values of the one or more user inputs. The example value stream map 602 includes one or more processes (e.g., action items) for development of the software application.

Figure 7:
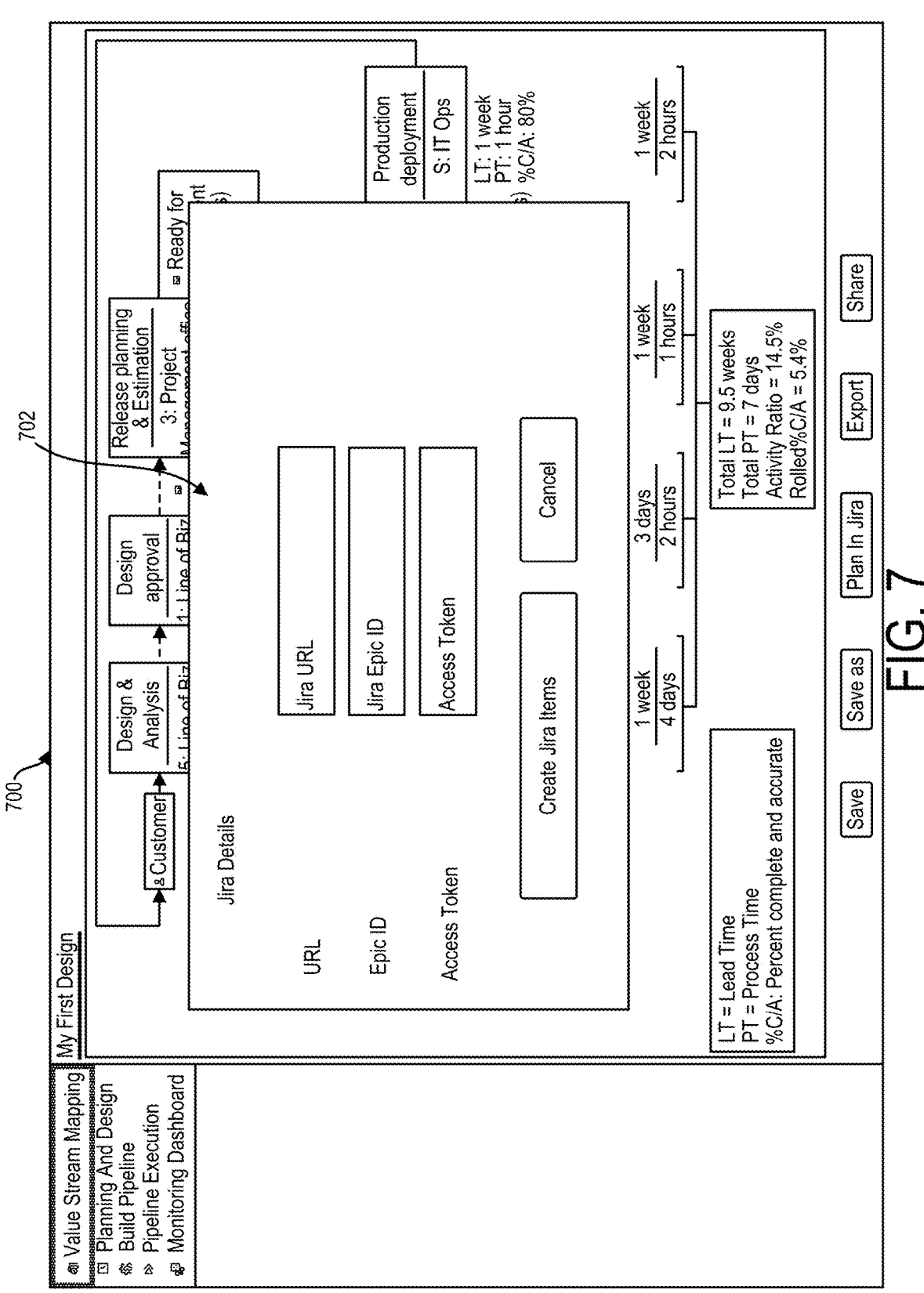
FIG. 7 depicts an example user interface for value stream mapping using a continuous integration/continuous delivery platform, in accordance with some example embodiments.

Once customization of the value stream map 602 is completed, the value stream map 602 customized based on the selected value stream mapping template 212 may be saved, shared, exported, and/or executed in another application (e.g., an application in communication with the CI/CD platform 145 and/or integrated as part of the CI/CD platform 145). Referring back to FIG. 2, the other application may include the automatic task creation 224 of the DevOps toolchain third party integration 208. As an example, FIG. 7 depicts an example user interface 700 showing a form 702 in which the user 140 may provide one or more user inputs, such as a URL, unique identifier, and/or the like for saving, exporting, sharing, and/or executing the customized value stream map. Accordingly, the CI/CD platform 145 may include integrated value stream mapping.

Referring back to FIG. 2, the architecture design 204 of the CI/CD platform 145 may include inbuilt architecture design tooling 216 and picture to architecture design capability 218. For example, the CI/CD platform 145 may include built-in tools for designing a technical architecture of the CI/CD model and/or pipeline, and/or the end to end DevOps process. Additionally and/or alternatively, the CI/CD platform provides image to architecture diagram conversion. For example, the CI/CD platform 145 may receive, from the user 140 and/or via the client device 120, uploaded images. The images may include hand drawn architecture designs. For example, the images may include an image of an architecture representing at least a portion of the one or more software applications 152. The CI/CD platform 145 (e.g., via the CI/CD engine 110) may convert the images into architecture diagrams that can be executed by the CI/CD engine 110 and/or exported to another application, such as the architecture design tools 226 of the DevOps toolchain third party integration 208 (see FIG. 2). The CI/CD engine 110 may convert the images using one or more image conversion techniques. Accordingly, the CI/CD platform 145 may, based on the upload images, generate an architecture diagram representing the architecture for display via the client device 120.

Figure 8:
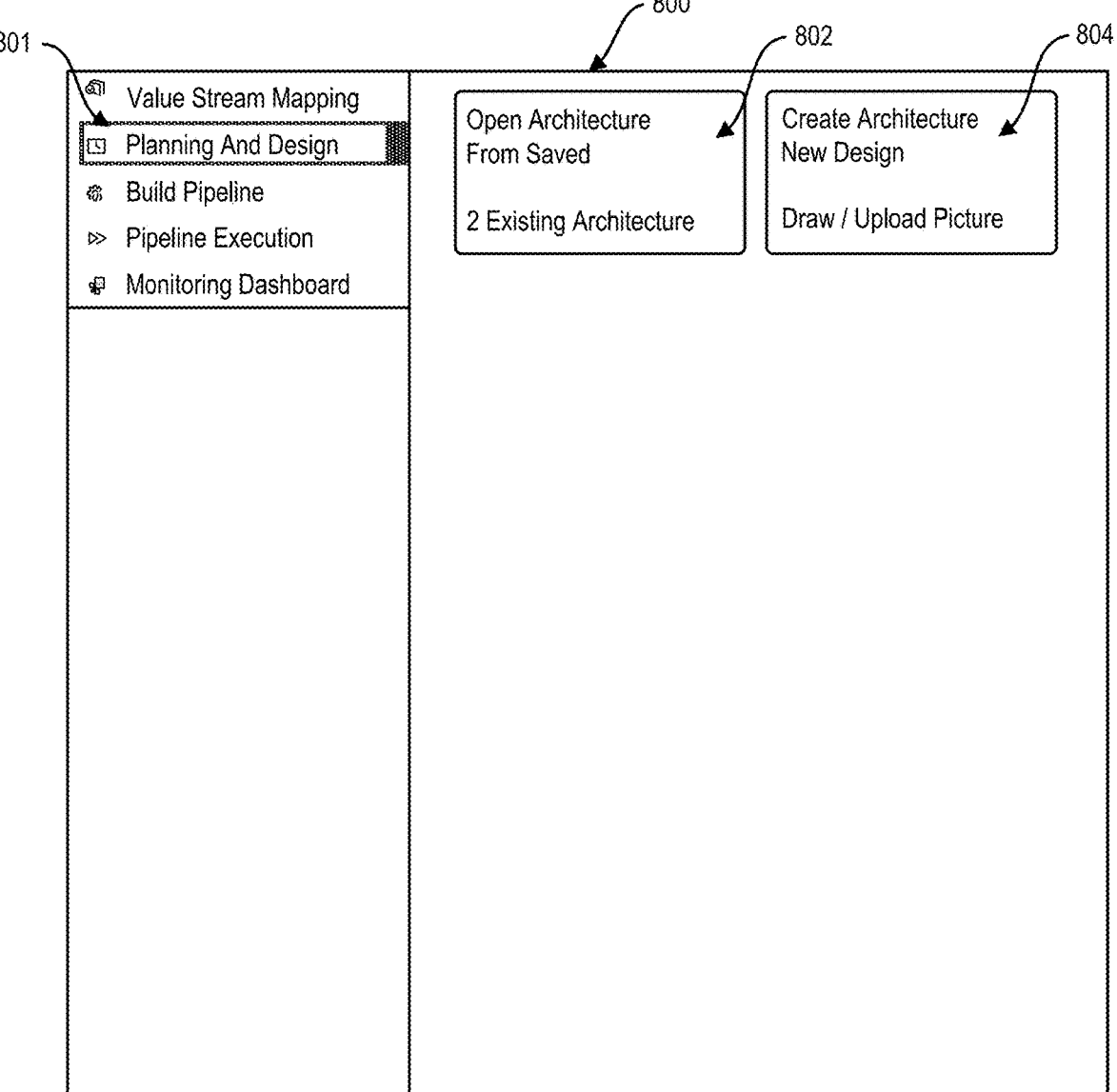
FIG. 8 depicts an example user interface for architecture design using a continuous integration/continuous delivery platform, in accordance with some example embodiments.

FIG. 8 depicts an example user interface 800, in accordance with example embodiments, that may be displayed at the client device 120. As shown in FIG. 8, planning and designs can be selected by the user 140 at 801. The user interface 800 includes a first option 802 to open an existing architecture diagram for the one or more software applications 152 and a second option 804 to create a new architecture diagram for the one or more software applications 152. The existing architecture may be stored at the enterprise backend 150.

Figure 9:
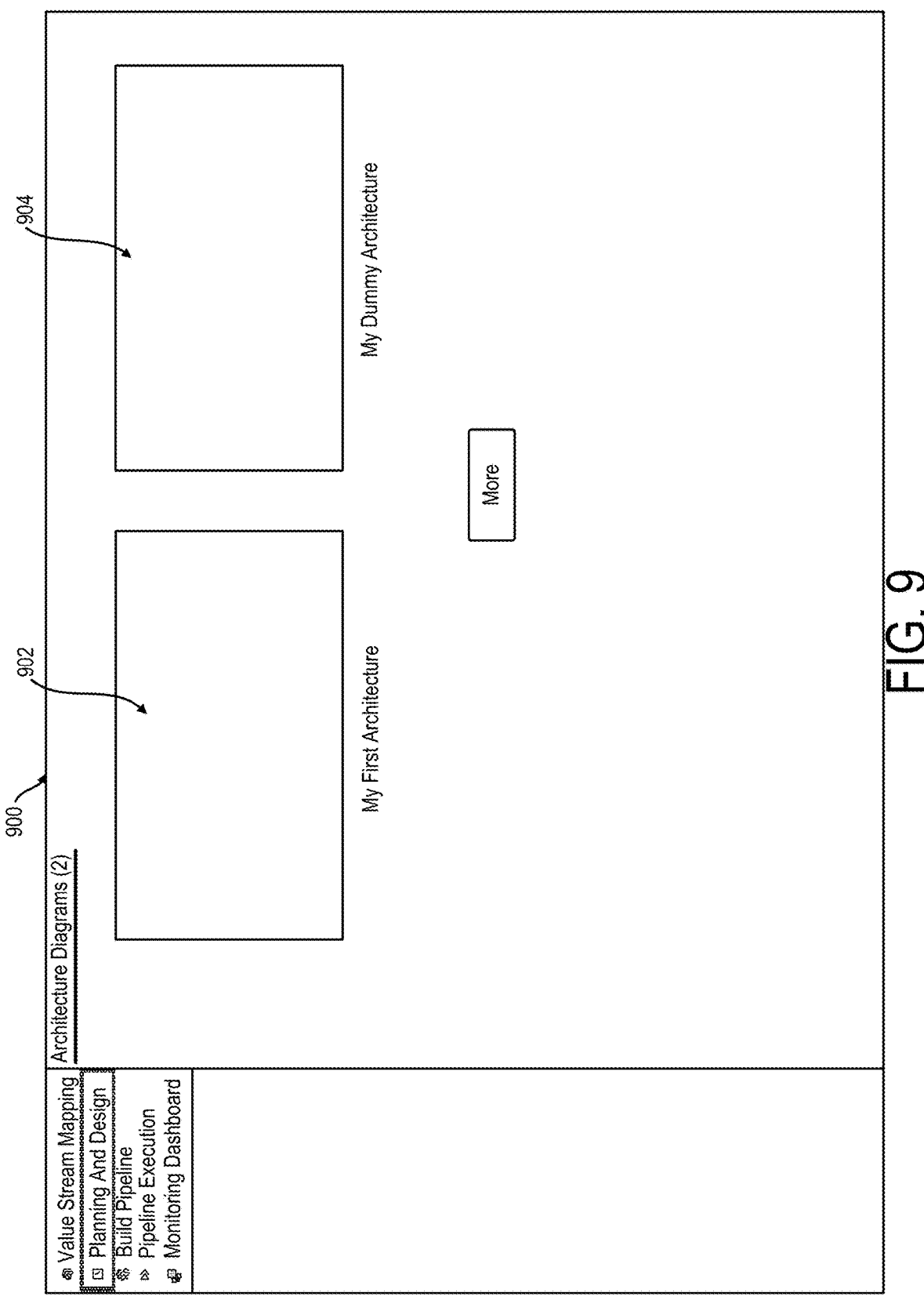
FIG. 9 depicts an example user interface for architecture design using a continuous integration/continuous delivery platform, in accordance with some example embodiments.

The first option 802 and the second option 804 may be selected by the user 140. As an example, the saved architecture diagrams may be selected by the user 140 via a user interaction with the first option 802 within the user interface 800 at the client device 120. Based at least upon detection (e.g., by the CI/CD engine 110) of the selection, a user interface 900 (see FIG. 9) may be displayed via the client device 120. As shown in FIG. 9, the user interface 900 includes two examples of previously created and saved architecture diagrams 902, 904, although other architecture diagrams may be saved, accessed, and/or presented to the user 140.

Figure 10:
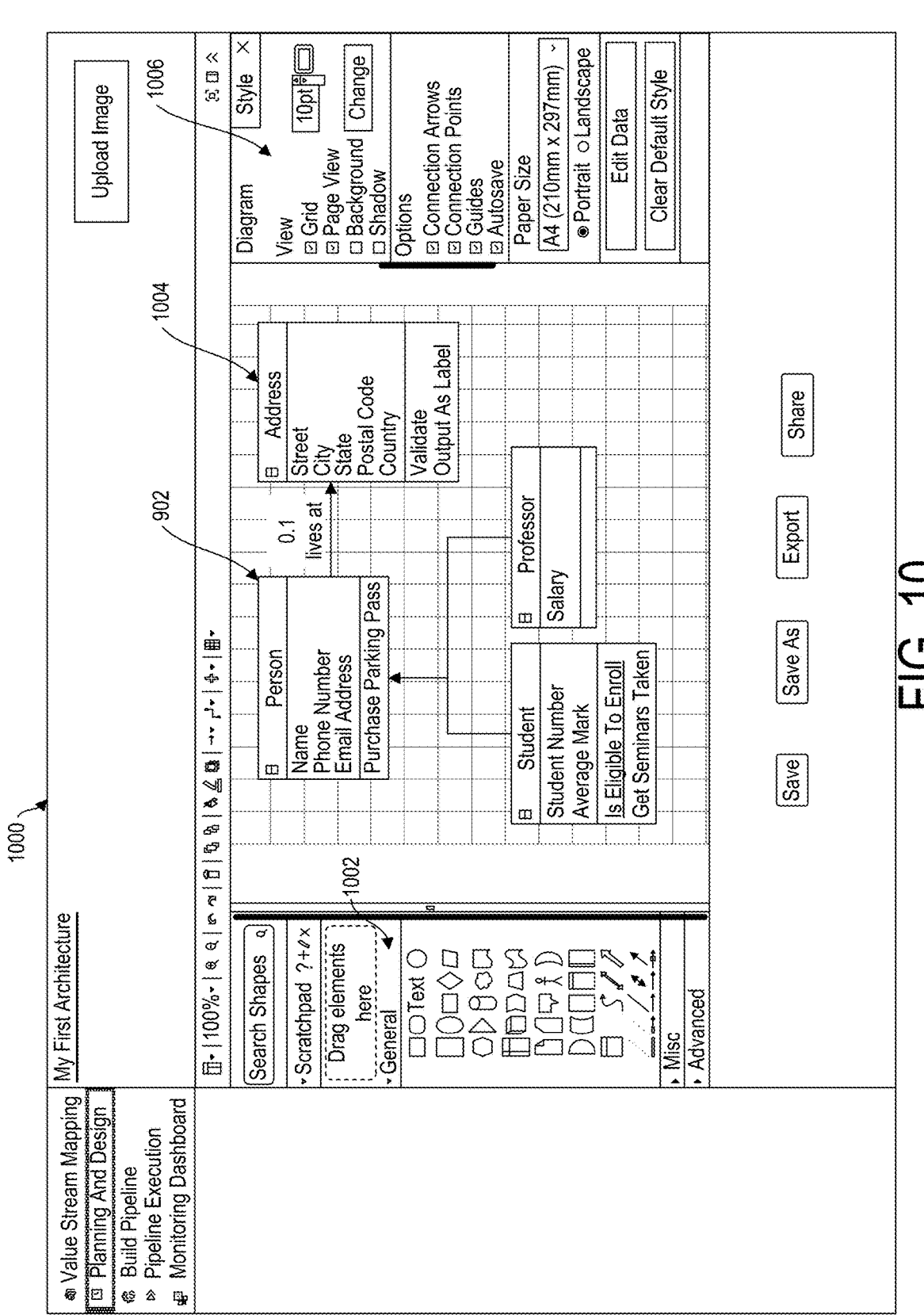
FIG. 10 depicts an example user interface for architecture design using a continuous integration/continuous delivery platform, in accordance with some example embodiments.
Figure 11:
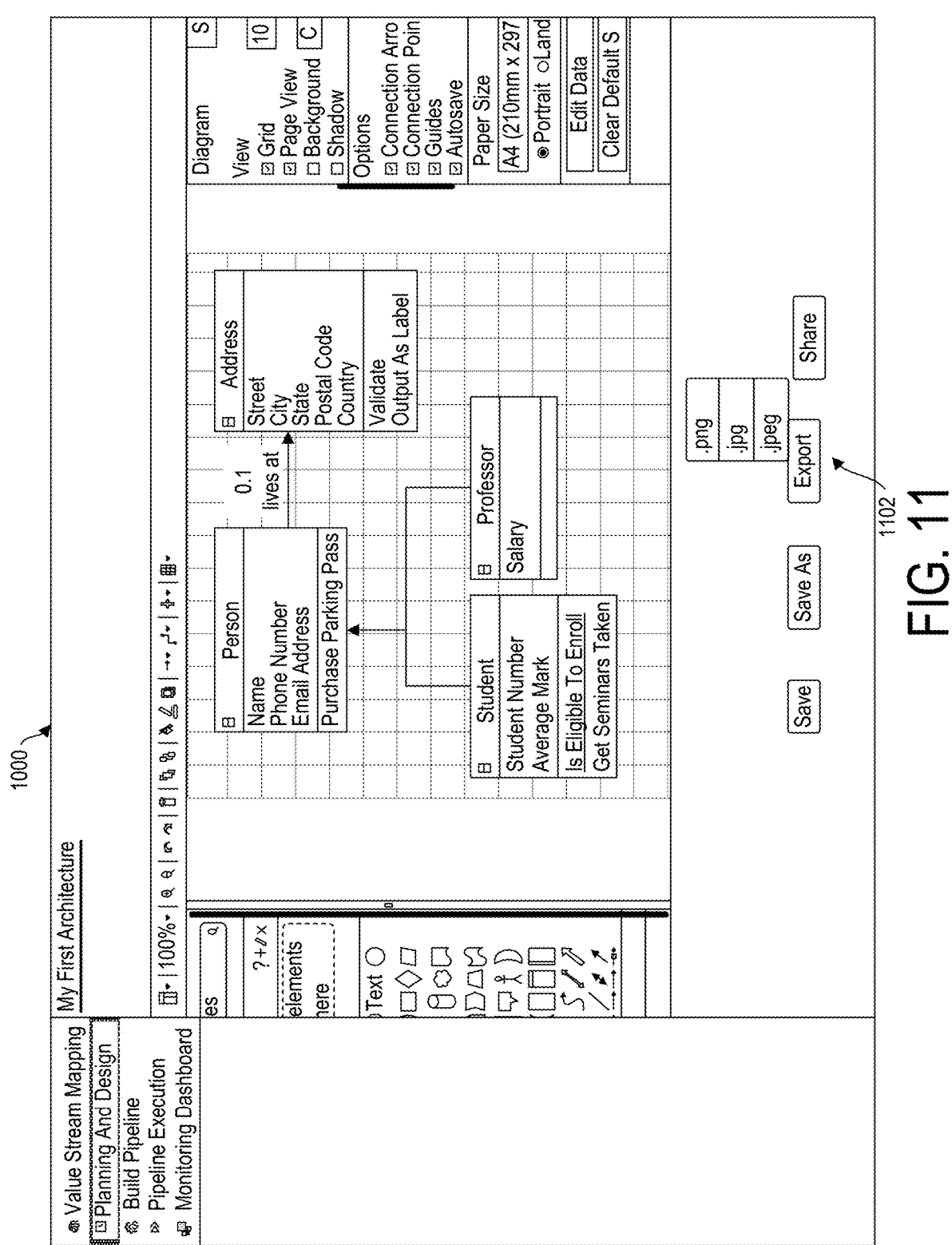
FIG. 11 depicts an example user interface for architecture design using a continuous integration/continuous delivery platform, in accordance with some example embodiments.
Figure 12:
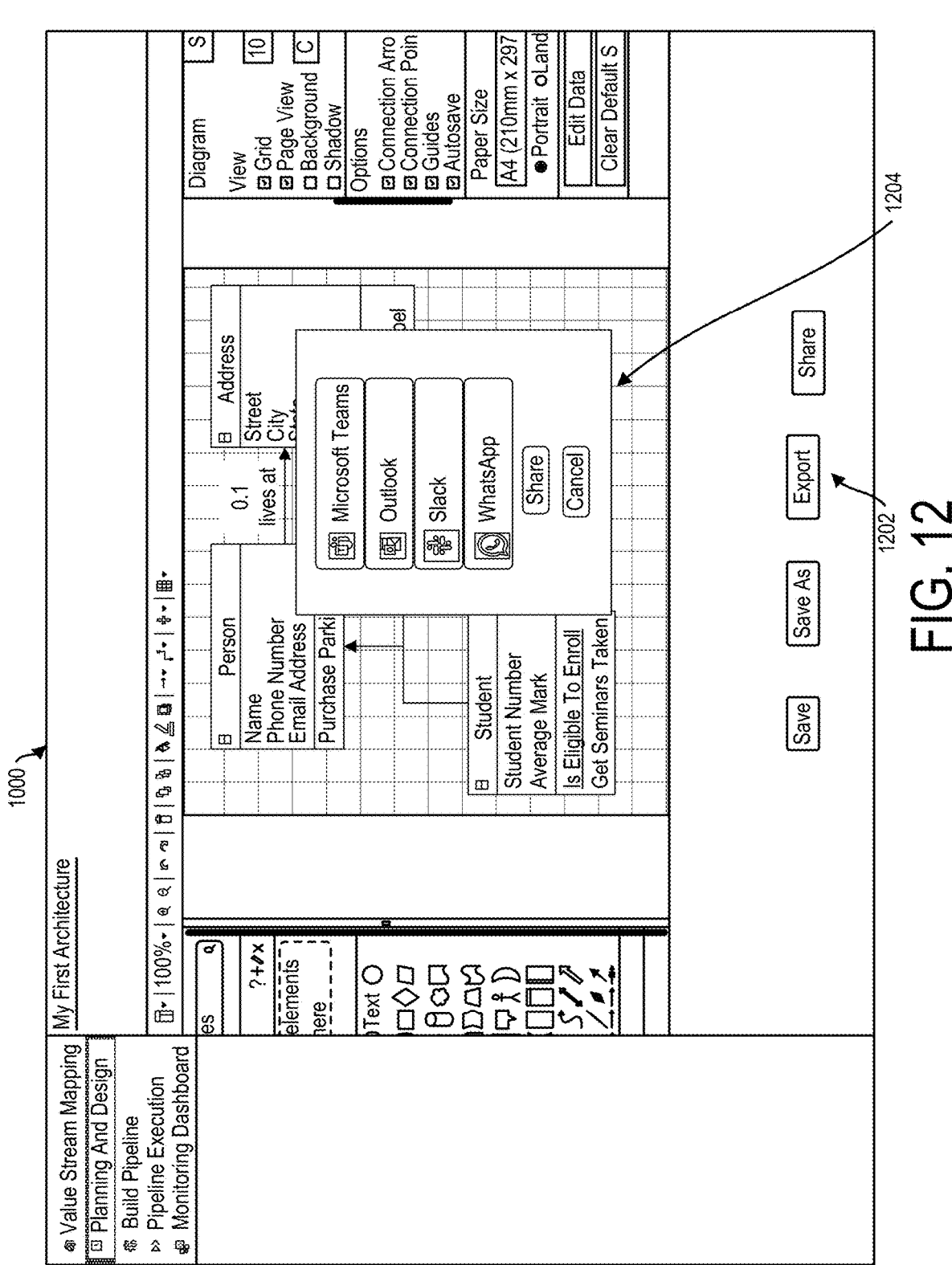
FIG. 12 depicts an example user interface for architecture design using a continuous integration/continuous delivery platform, in accordance with some example embodiments.

FIG. 10 illustrates another example user interface 1000, in accordance with some example embodiments. The user interface 1000 may be generated and displayed based on a detection of a selection of the architecture diagram 902 via the user interface 900. The user interface 1000 may allow for modification of the architecture diagram 902. For example, the CI/CD engine 110 may retrieve the stored architecture diagram 902 and display the architecture diagram 902 in a central panel 1004 of the user interface 1000 for modification of the architecture diagram 902. The architecture diagram 902 may be modified via selection of one or more diagram tools shown in a first side panel 1002 and/or via entry of one or more properties of one or more components of the architecture diagram 902 in a second side panel 1006. The user interface 1000 may indicate a version of the architecture diagram 902. Modifications to the architecture diagram 902 can be saved, shared, and/or exported. For example, as shown in FIG. 11, the architecture diagram 902 may be exported in different image formats (e.g., .png, .jpg, peg, etc.) via selection of an export element 1102 in the user interface 1000. Additionally and/or alternatively, the architecture diagram 902 may be shared, using one or more messaging platforms or other third party applications (e.g., integrated applications such as the architecture design tools 226), via selection of a share element 1202 in the user interface 1000. FIG. 12 shows an example of a pop-up 1204 displayed over the architecture diagram 902 in the user interface 1000 upon selection of the share element 1202.

Figure 13:
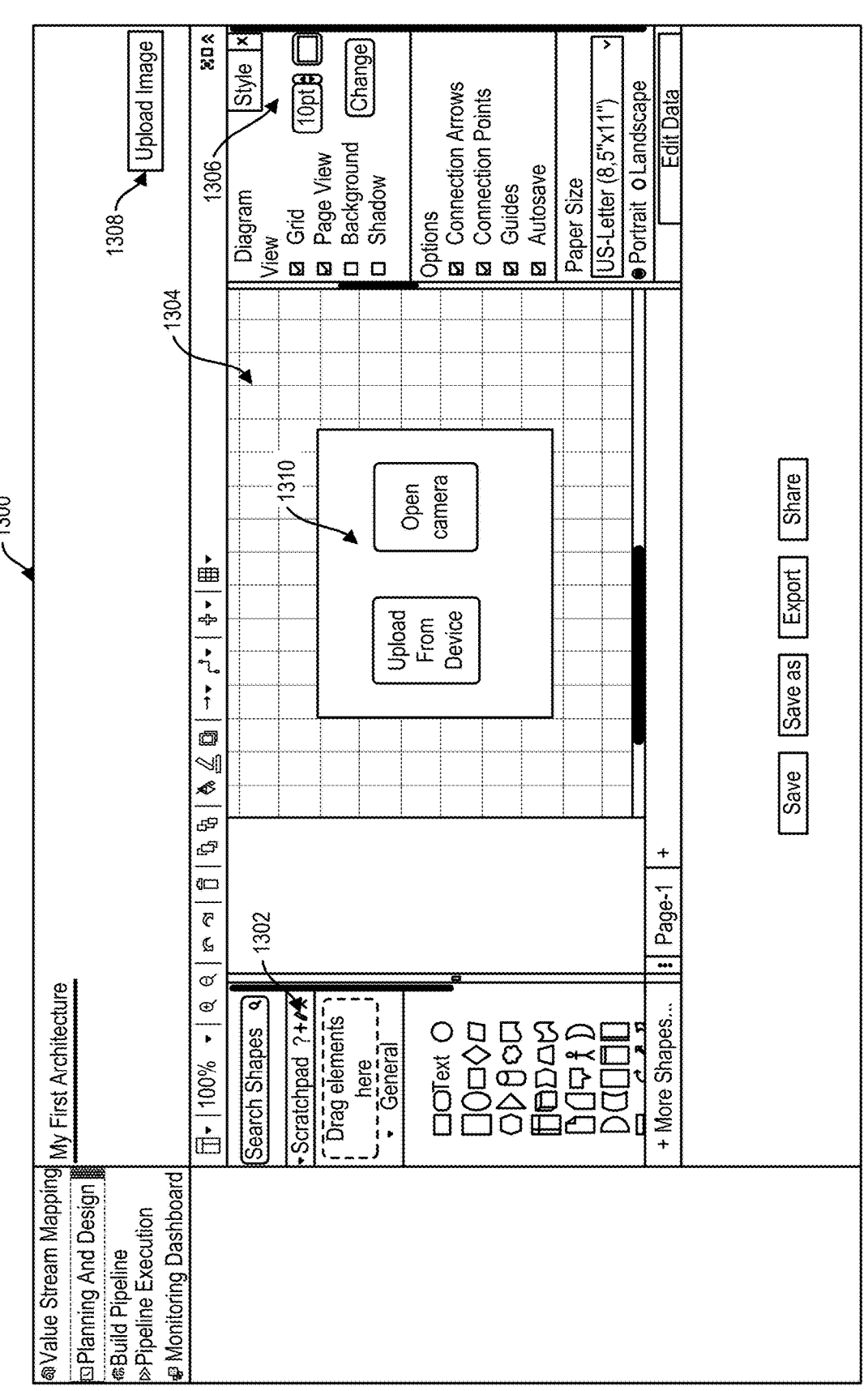
FIG. 13 depicts an example user interface for architecture design using a continuous integration/continuous delivery platform, in accordance with some example embodiments.

Referring back to FIG. 8 the second option 804 may be selected by the user 140 to create a new architecture diagram for the one or more software applications 152. As an example, the second option 804 may be selected by the user 140 via a user interaction with the second option 804 within the user interface 800 at the client device 120. Based at least upon detection (e.g., by the CI/CD engine 110) of the selection, a user interface 1300 (see FIG. 13) may be generated and displayed via the client device 120. As shown in FIG. 13, the user interface 1300 may include a first side panel 1302, a central panel 1304, and a second side panel 1306. The architecture diagram may be displayed and/or generated in the central panel 1304. The architecture diagram (not shown) may be modified via selection of one or more diagram tools shown in the first side panel 1302 and/or via entry of one or more properties of one or more components of the architecture diagram in a second side panel 1306.

The user interface 1300 may include a selectable element 1308 that may be selected by the user 140 to upload an image. Based on detection of a selection of the selectable element 1308, a popup 1310 is displayed within the central panel 1304 of the user interface 1300. The popup 1310 includes an option to open a camera of the client device 120 and/or to upload an image stored on the client device 120. As noted, the image may include hand drawn architecture designs or other images of architecture designs for designing the software application 152 and/or the CI/CD pipeline. For example, the image may include an image of an architecture representing at least a portion of the one or more software applications 152 and/or the CI/CD pipeline for developing the one or more software applications 152.

Figure 14:
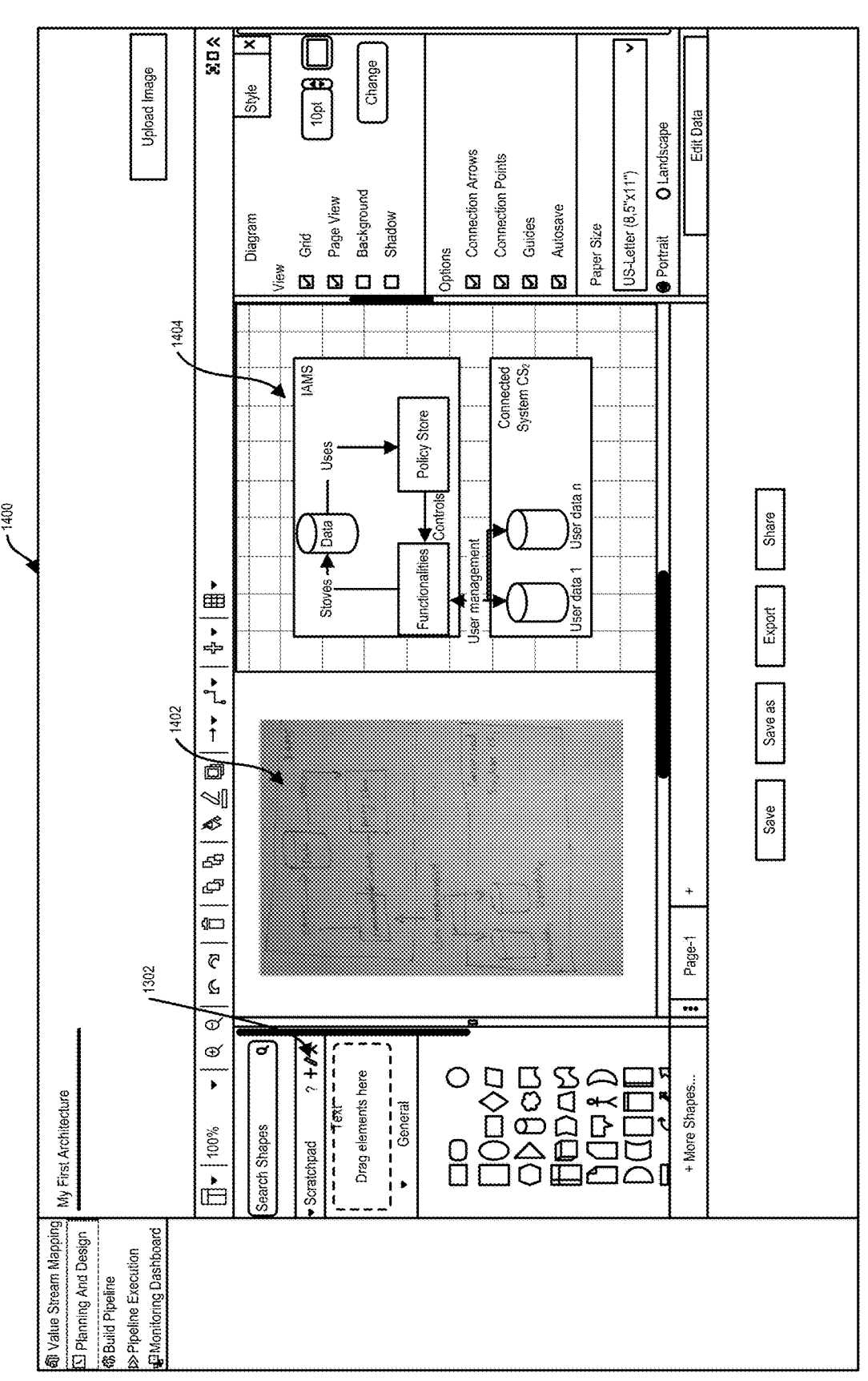
FIG. 14 depicts an example user interface for architecture design using a continuous integration/continuous delivery platform, in accordance with some example embodiments.

The CI/CD platform 145 (e.g., via the CI/CD engine 110) may convert the uploaded and/or captured image into an architecture diagram that can be executed by the CI/CD engine 110 and/or exported to another application, such as the architecture design tools 226 of the DevOps toolchain third party integration 208 (see FIG. 2). The CI/CD engine 110 may convert the image using one or more image conversion techniques. The CI/CD platform 145 may, based on the upload images, generate an architecture diagram representing the architecture for display via the client device 120, with minimal coding requirements for the user 140. FIG. 14 illustrates an example user interface 1400, in accordance with some example embodiments. As shown in FIG. 14, the user interface 1400 includes an uploaded image 1402 showing a hand drawn architecture diagram. The user interface 1400 also includes the architecture diagram 1404 generated based on the uploaded image 1402 using one or more image conversion techniques. The generated architecture diagram 1404 may be used by the CI/CD engine 110 of the CI/CD platform 145 for execution of the CI/CD pipeline. Additionally and/or alternatively, the generated architecture diagram 1404 may be exported for use by another application, shared, and/or stored. Thus, the CI/CD platform 145 integrates architecture diagram design and can generate architecture diagrams with minimal coding requirements for the user 140.

Referring back to FIG. 2, the CI/CD pipeline development 206 of the CI/CD platform 145 may include drag and drop CI/CD pipelines 220 and/or smart suggestions 222. The drag and drop CI/CD pipelines 220 may include the CI/CD pipeline described herein for developing a software application, including building, testing, and deploying the software application. Consistent with some example embodiments, the CI/CD platform 145 (e.g., the CI/CD engine 110) may implement a low code or no code approach to the creation of the CI/CD pipeline 220. Accordingly, the CI/CD engine 110 may support the creation of the CI/CD pipeline 220 with minimal requirement for coding. This helps to solve the complexity of otherwise writing large codebases for developing CI/CD pipelines, and improves the computing efficiency of generating and/or executing the CI/CD pipelines. As described in more detail below, the CI/CD platform 145 (e.g., the CI/CD engine 110) may provide the smart suggestions 222 via the user interface of the client device 120 to improve the arrangement of the CI/CD pipeline 220 for more efficient building, testing, and deploying of the software application (e.g., the one or more software applications 152).

Figure 15:
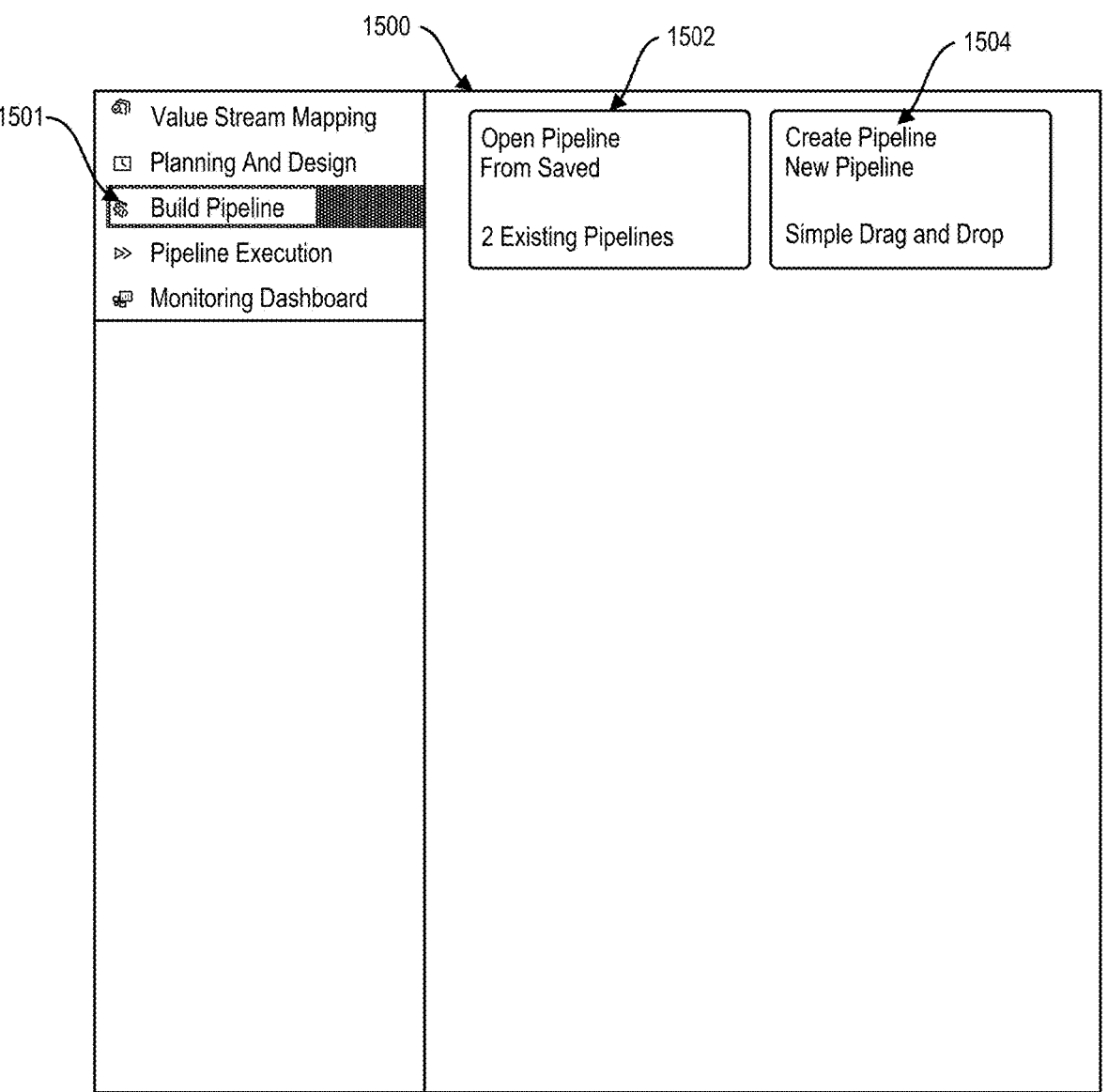
FIG. 15 depicts an example user interface for continuous integration/continuous delivery pipeline building using a continuous integration/continuous delivery platform, in accordance with some example embodiments.

In some embodiments, the CI/CD platform 145 (e.g., the CI/CD engine 110) may receive a request to build a CI/CD pipeline, such as the CI/CD pipeline 220, for developing a software application, such as the one or more software applications 152. The request includes one or more input values for the CI/CD pipeline 220 (described in more detail with respect to FIG. 17). The CI/CD platform 145 may receive the request via a user interface at the client device 120. For example, FIG. 15 depicts an example user interface 1500, in accordance with some example embodiments. As shown in the user interface 1500, the user 140 may select, via the CI/CD platform 145, to build pipeline at 1501. Based at least on detection of the selection, the CI/CD platform 145 displays a first option 1502 for opening an existing CI/CD pipeline and a second option 1504 for creating a new CI/CD pipeline.

Figure 16:
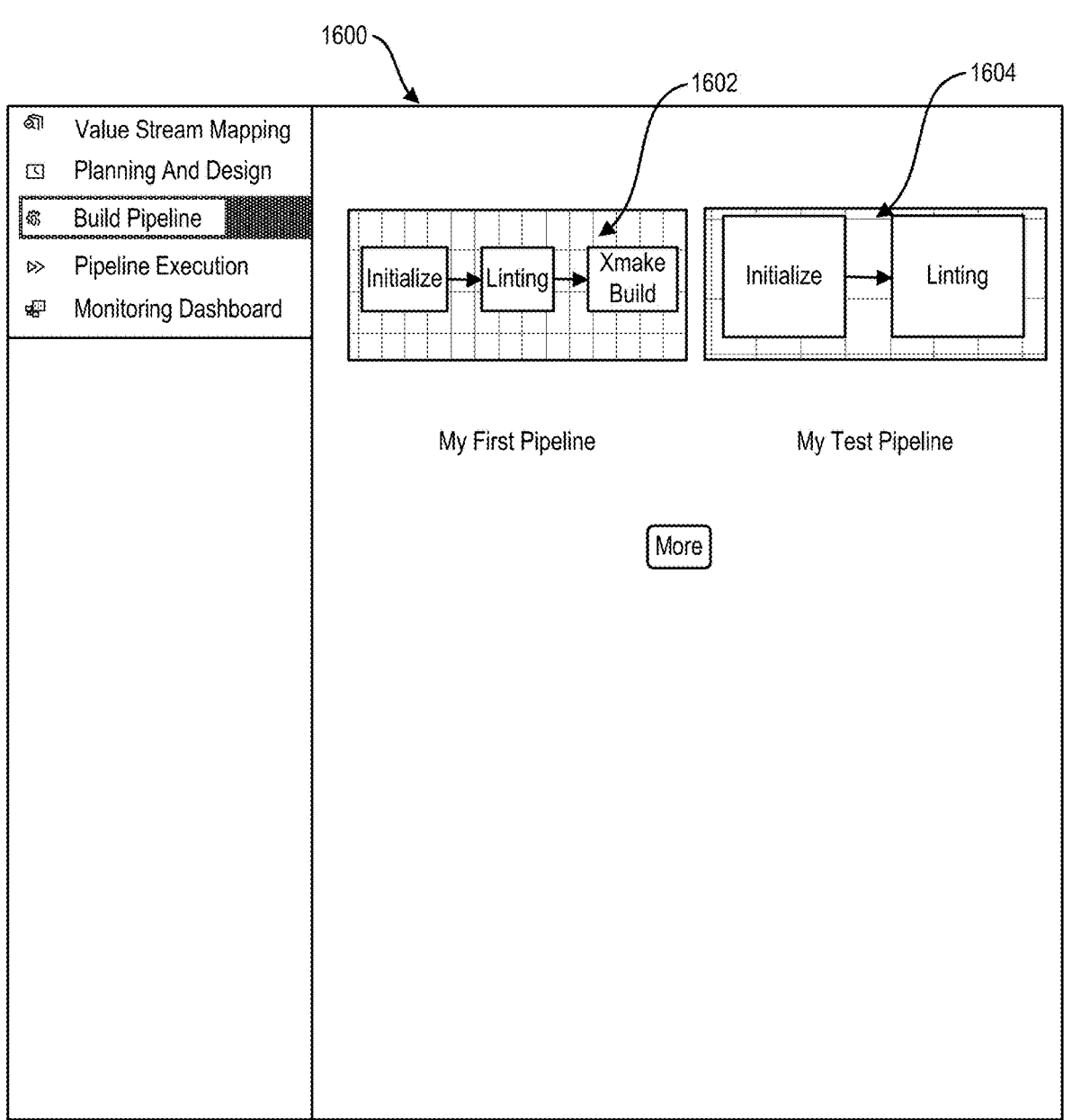
FIG. 16 depicts an example user interface for continuous integration/continuous delivery pipeline building using a continuous integration/continuous delivery platform, in accordance with some example embodiments.

FIG. 16 shows an example user interface 1600, in accordance with some example embodiments. The user interface 1600 is displayed based on a selection of the first option 1502 for opening an existing CI/CD pipeline. The user interface 1600 may display a first existing CI/CD pipeline 1602, a second existing CI/CD pipeline 1604, and/or the like. The user 140 may select one of the existing CI/CD pipelines 1602, 1604 for execution and/or modification of the existing CI/CD pipelines 1602, 1604.

Figure 17:
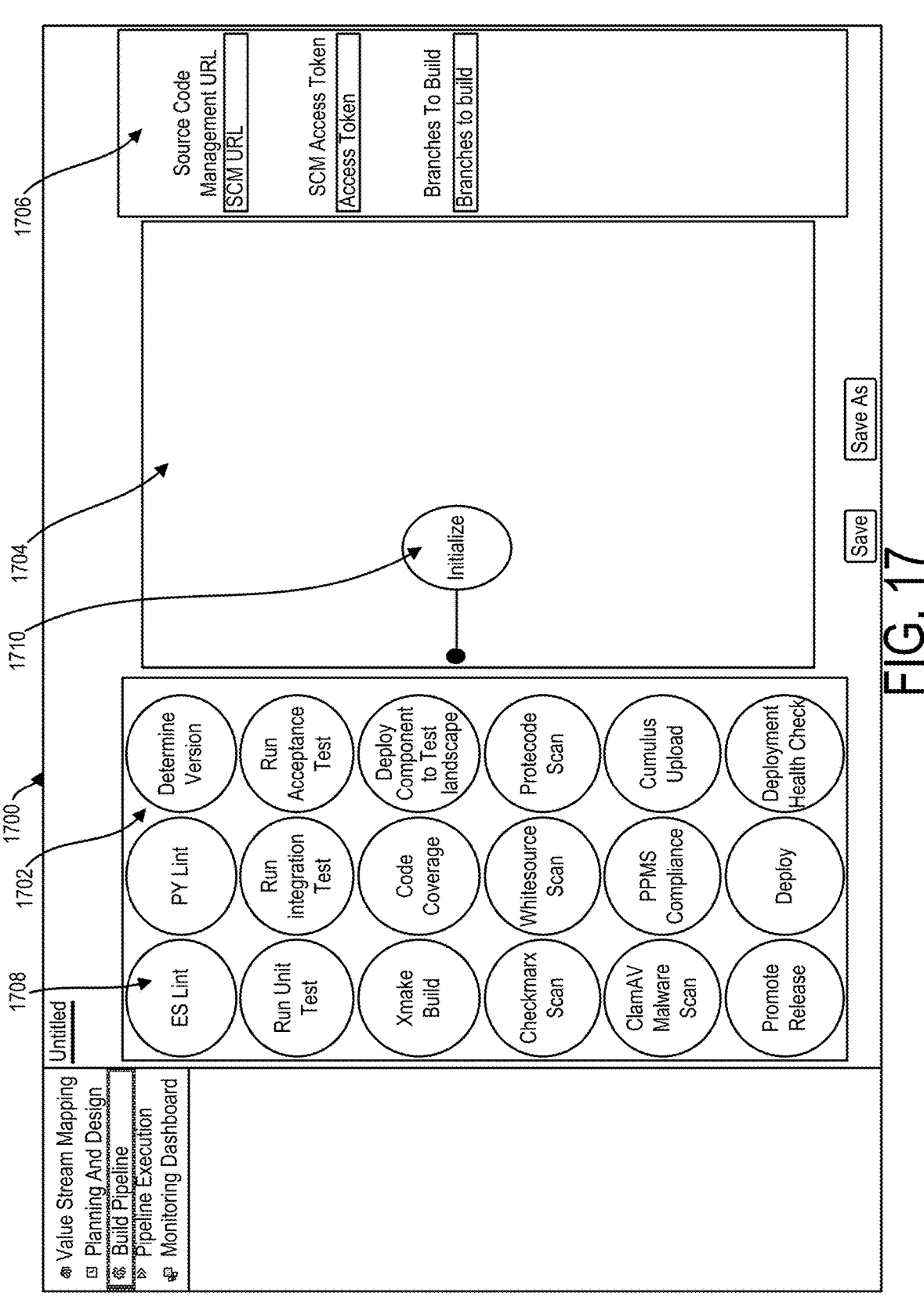
FIG. 17 depicts an example user interface for continuous integration/continuous delivery pipeline building using a continuous integration/continuous delivery platform, in accordance with some example embodiments.

FIG. 17 shows another example user interface 1700, in accordance with some example embodiments. The user interface 1700 is displayed by the CI/CD platform 145 via the client device 120 based on a selection of the second option 1504 for creating a new CI/CD pipeline. As described herein, the CI/CD platform 145 implements a low code or no code approach to the creation of the CI/CD pipeline. Accordingly, the CI/CD engine 110 may support the creation of the CI/CD pipeline with minimal requirement for coding.

The CI/CD platform 145 may build and/or support building of the CI/CD pipeline using the low code no code approach based on the user interface 1700 shown in FIG. 17. As shown in FIG. 17, the user interface 1700 may include three portions, such as a first portion 1702, a second portion 1704 (e.g., a central portion), and a third portion 1706.

The first portion 1702 of the user interface 1700 may be a left panel displaying visual elements representing a plurality of pre-built stages 1708 for the CI/CD pipeline. The plurality of pre-built stages 1708 may represent components of the CI/CD pipeline. As noted herein, the CI/CD pipeline includes a plurality of stages for building, testing, and deploying code for the one or more software applications 152. The plurality of pre-built stages 1708 displayed in the user interface 1700 are pre-built. For example, the underlying code or logic corresponding to each pre-built stage of the plurality of pre-built stages 1708 is pre-written and stored in the library 155. This allows for quick and efficient selection and/or arrangement of one or more pre-built stages of the plurality of pre-built stages to build the CI/CD pipeline. The plurality of pre-built stages 1708 may include a linting stage, a determine version stage, a run unit test stage, a run integration test stage, a run acceptance test stage, a make build stage, a code coverage stage, a deploy component to test landscape stage, a checkin scan stage, a source scan stage, a protocode scan stage, a malware scan stage, a compliance stage, an upload stage, a promote release stage, a deploy stage, a deployment health check stage, and/or the like. Accordingly, the plurality of pre-built stages 1708 may include one or more processes of the CI/CD pipeline.

The CI/CD platform 145 may build the CI/CD pipeline by at least receiving, via the user interface 1700 at the client device 120, a selection of one or more pre-built stages from the plurality of pre-built stages 1708 of the CI/CD pipeline. The plurality of pre-built stages 1708 may be displayed via the user interface 1700 and may be represented by selectable and/or configurable visual elements on the user interface. The user 140 at the client device 120 may interact with the first portion 1702 and/or the visual elements representing the plurality of pre-built stages 1708, for example, by selecting one or more pre-built stages of the plurality of pre-built stages 1708.

The second portion 1704 of the user interface 1700 may be a center panel displaying a region of the user interface 1700 in which the CI/CD pipeline is being built. The user 140 at the client device 120 may interact with the first portion 1702 and/or the visual elements representing the plurality of pre-built stages 1708, for example, by dragging the selected one or more pre-built stages and dropping the selected one or more pre-built stages into the center panel to arrange the one or more pre-built stages in an arrangement defining the CI/CD pipeline. The one or more pre-built stages may be arranged in series and/or in parallel. Thus, the CI/CD platform may build the CI/CD pipeline by at least arranging, via the user interface 1700, the selected one or more pre-built stages, with minimal or no coding requirements for the user 140. In the example user interface 1700 shown in FIG. 17, the CI/CD pipeline being built in the second portion 1704 is represented at 1710, where a first pre-built stage has been dragged and dropped into the arrangement representing the CI/CD pipeline.

Arranging the selected one or more pre-built stages 1708 includes receiving, via the user interface 1700, a user input causing the selected one or more pre-built stages 1708 to be dragged from the first portion 1702 of the user interface 1700 to the second portion 1704 of the user interface 1700. As described herein, the CI/CD pipeline may be configured in the second portion 1704 of the user interface 1700 by, for example, dragging and dropping the selected one or more pre-built stages into an arrangement (e.g., the arrangement at 1710) defining the CI/CD pipeline. In some embodiments, arranging the selected one or more pre-built stages 1708 includes adding one or more pre-built stages 1708 from the first portion 1702 to the second portion 1704 of the user interface 1700, reordering the one or more pre-built stages 1708 at the second portion 1704 of the user interface 1700, configuring a property of the selected one or more pre-built stages 1708, and/or removing the one or more pre-built stages 1708 from the second portion 1704 of the user interface 1700. Accordingly, the CI/CD platform 145 (e.g., the CI/CD engine 110) may build the CI/CD pipeline with limited coding requirements on the user. In other words, the CI/CD platform 145 provides a low code no code approach for building the CI/CD pipeline.

The third portion 1706 of the user interface 1700 may be a right panel displaying a region of the user interface 1700 in which the user 140 provides one or more user inputs, such as one or more input values. The one or more input values may include one or more parameters specific to the particular software application. For example, the one or more input values may include properties associated with various stages of the CI/CD pipeline for developing the particular software application. The one or more properties associated with the pre-built stages 1708 may be adjusted via the third portion 1706 and provided to the enterprise backend 150 for execution of the corresponding code in the library 155.

Figure 18:
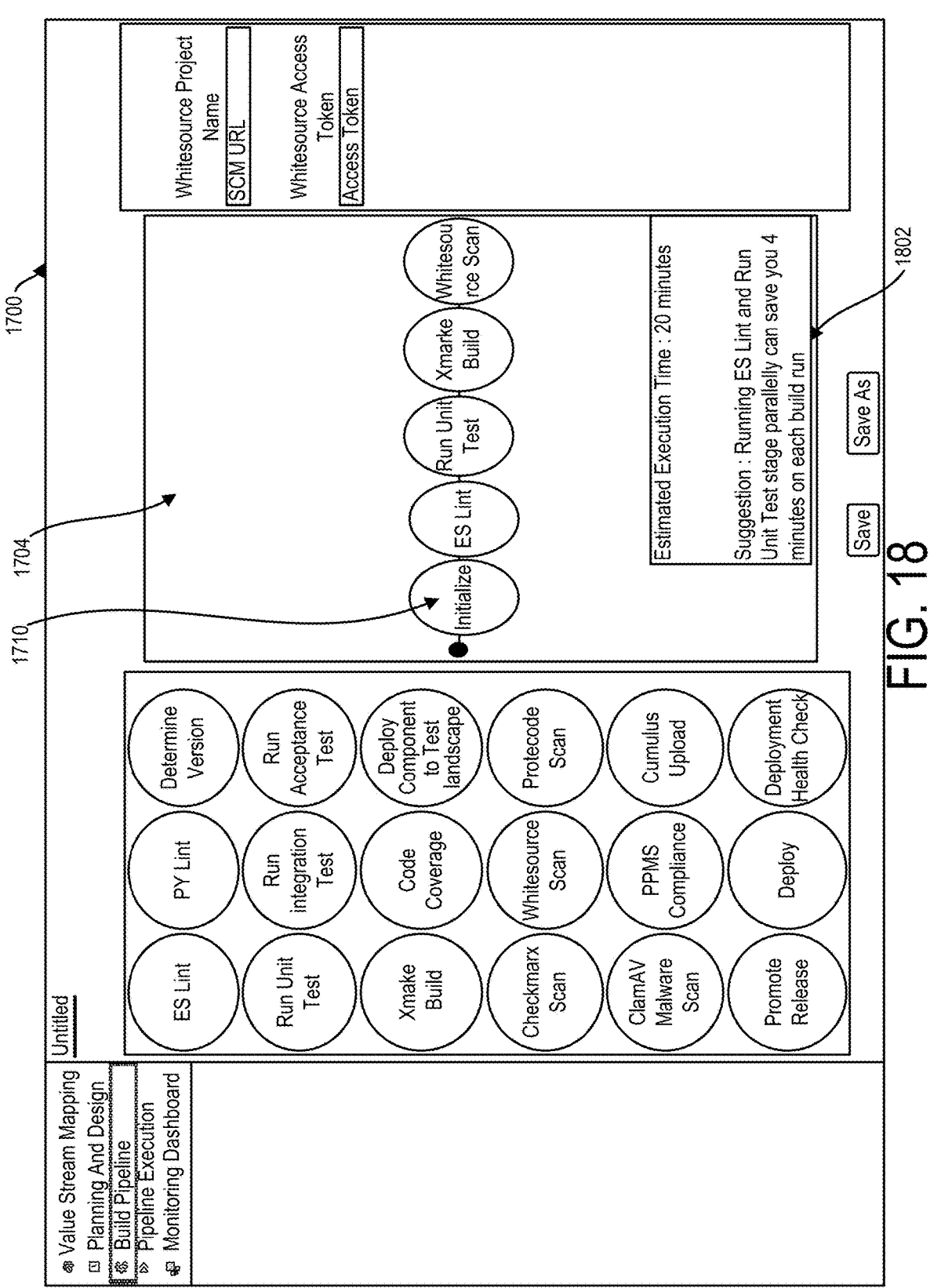
FIG. 18 depicts an example user interface for continuous integration/continuous delivery pipeline building using a continuous integration/continuous delivery platform, in accordance with some example embodiments.

In some embodiments, the CI/CD platform 145 (e.g., the CI/CD engine 110) generates, based on the arranged one or more pre-built stages 1708, a recommendation for re-arranging the selected one or more pre-built stages to improve the CI/CD pipeline. For example, the CI/CD platform 145 (e.g., the CI/CD engine 110) may display, via the user interface 1700, a suggestion or recommendation 1802 for rearranging the selected and arranged pre-built stages. The suggestion may improve the efficiency of executing the CI/CD pipeline. FIG. 18 depicts an example of the user interface 1700 showing the recommendation 1802. The recommendation 1802 may include an estimated execution time of a current arrangement of the CI/CD pipeline based on the arrangement provided by the user 140. The recommendation 1802 may additionally and/or alternatively provide an alternative arrangement of the one or more pre-built stages 1708, an estimated execution time of the suggested alternative arrangement, an estimated time savings for implementing the suggested alternative arrangement, and/or the like. The suggested alternative arrangement may include adjusting the one or more pre-built stages from parallel to series and/or series to parallel, reordering one or more pre-built stages, removing one or more pre-built stages, adding one or more pre-built stages, and/or the like.

In some embodiments, the CI/CD platform 145 may generate the recommendation 1802 based on one or more stored best practices for building and/or executing CI/CD pipelines. Additionally and/or alternatively, the CI/CD platform 145 may employ one or more trained machine learning models trained to predict a score indicating an optimal arrangement for the CI/CD pipeline based at least on the plurality of pre-built stages. The one or more trained machine learning models may predict an execution time for an alternative arrangement, may predict an impact in a change in the arrangement of the plurality of pre-built stages, and/or the like.

Consistent with embodiments of the current subject matter, the CI/CD platform 145 may, based on the one or more input values and/or the arranged one or more pre-built stages 1708 in the second portion 1704, execute the built CI/CD pipeline to develop the software application. The CI/CD platform 145 (e.g., the CI/CD engine 110) may execute the CI/CD pipeline by at least retrieving, from a database (e.g., the library 155) in communication with the CI/CD platform 145, code, which as described herein may be prewritten for each of the arranged one or more pre-built stages 1708. FIG. 19 shows example code 1900 corresponding to a pre-built stage for linting that may be stored in the library 155 of the enterprise backend 150.

The CI/CD platform 145 may execute the retrieved code for each of the arranged one or more pre-built stages 1708 according to the arrangement of the CI/CD pipeline. The built CI/CD pipeline may further be executed by at least providing the one or more input values to the code stored in the library 155 for each of the arranged one or more pre-built stages 1708. Accordingly, the CI/CD platform 145 provides a low code no code approach for executing the CI/CD pipeline, with minimal coding requirements on the user.

Referring back to FIG. 2, the CI/CD pipeline execution 210 of the CI/CD platform 145 may include automatic pipeline execution 232 and single view 234 of all executions. As noted above, the CI/CD platform 145 and/or a separate application may execute the CI/CD pipeline based on the arranged pre-built stages and/or the one or more user inputs. Further, as described herein the CI/CD platform 145 provides a single view 234 of a status of the execution of each of the pre-built stages of the CI/CD pipeline.

As an example of the single view 234, FIG. 20 depicts an example user interface 2000, in accordance with some embodiments. As shown in FIG. 20, the user 140 may select the pipeline execution 2002 to display the single view 234 of the status of the execution of each of the pre-built stages of the CI/CD pipeline. The single view shows a version of each of the pre-built stages, a duration of the execution of each of the pre-built stages, a test report (e.g., failed, skipped, paused, etc.) for each of the pre-built stages, and/or additional status indicators describing the status of the execution of the CI/CD pipeline. Thus, the CI/CD platform may generate and/or display a visual representation of a status of the testing of each of the arranged one or more pre-built stages of the CI/CD pipeline. This provides a single platform and unified view of all CI/CD pipeline executions and/or test reports generated for each check of each pre-built stage of the CI/CD pipeline.

Referring back to FIG. 2, the CI/CD pipeline monitoring 212 of the CI/CD platform 145 may include an inbuilt monitoring dashboard 228 and an inbuilt DevOps KPI monitoring 230. For example, the CI/CD platform 145 offers monitoring of active microservices CI/CD pipelines (e.g., the built CI/CD pipeline including the arranged one or more pre-built stages) to record the most recent versions of the CI/CD pipelines and a run status for the CI/CD pipelines. This provides stakeholders with a consistent and transparent view of the progress of the end to end development of the one or more software applications 152. Additionally and/or alternatively, this allows for generation of reports offline. As an example, FIG. 21 depicts an example user interface 2100, in accordance with some embodiments. As shown in FIG. 21, a user 140 may select, via the user interface 2100, the monitoring dashboard at 2102 to display the inbuilt monitoring dashboard 228. The inbuilt monitoring dashboard 228 provides a current view of the software application, including all microservices associated with the software application.

As shown in FIG. 21, the CI/CD platform 145 generates and/or displays a visual representation (e.g., the inbuilt monitoring dashboard 228) of a status of the overall software development. In this way, the CI/CD platform monitors the progress of software application development, building, testing, and deployment, and provides end to end updates. Further, as described herein, the CI/CD platform 145 provides an end to end solution for software application development. The inbuilt monitoring dashboard 228 allows for tracking of the end to end solution in a single, easily accessible component of the CI/CD platform 145.

Figure 22:
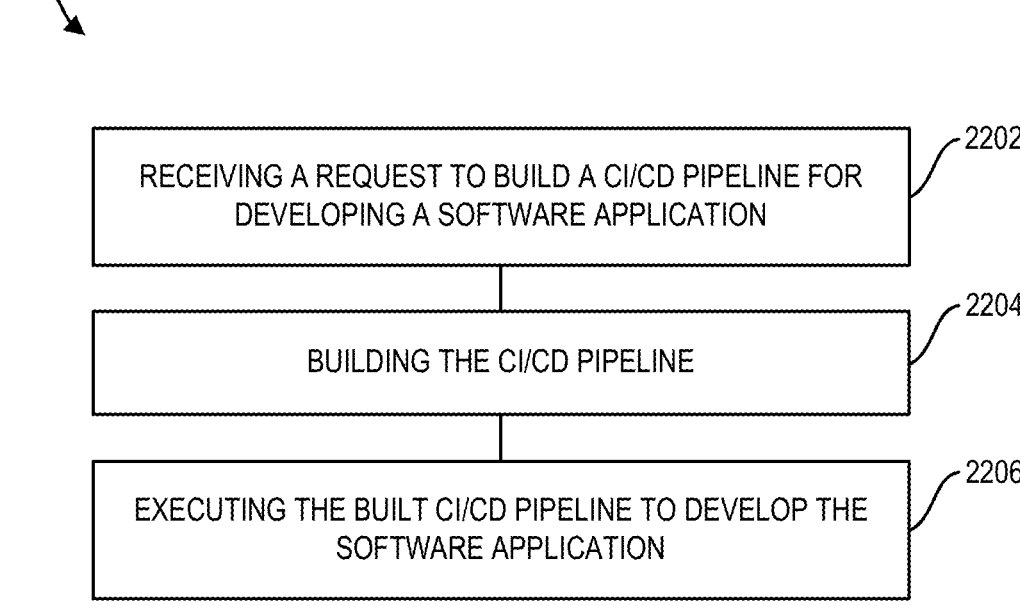
FIG. 22 depicts a flowchart illustrating an example of a process for implementing a continuous integration/continuous delivery platform, in accordance with some example embodiments.

FIG. 22 depicts a flowchart illustrating a process 2200 for implementing a low code no code CI/CD platform (also referred to herein as an "integration and delivery platform"), in accordance with some example embodiments. Referring to FIGS. 1-21, one or more aspects of the process 2200 may be performed by the CI/CD system 100, the CI/CD platform 145, the CI/CD engine 110, the client device 120, the enterprise backend 150, other components therein, and/or the like.

At 2200, an integration and delivery platform (e.g., the CI/CD platform 145 including the CI/CD engine 110) may receive a request to build a CI/CD pipeline (also referred to herein as an "integration and delivery platform") for developing a software application, such as the one or more software applications 152. The request includes one or more input values for the CI/CD pipeline. The one or more input values may include one or more parameters specific to the particular software application. For example, the one or more input values may include properties associated with various stages of the CI/CD pipeline for developing the particular software application. The integration and delivery platform may receive the request via a user interface (e.g., the user interface 125) at a client device (e.g., the client device 120). The integration and delivery platform may run on the client device and/or be in communication with the client device.

At 2202, the integration and delivery platform (e.g., the CI/CD platform 145 including the CI/CD engine 110) may build the CI/CD pipeline. For example, the integration and delivery platform may build the CI/CD pipeline by at least receiving, via the user interface of the client device, a selection of one or more pre-built stages from a plurality of pre-built stages of the CI/CD pipeline. The plurality of pre-built stages may be displayed via the user interface and may be represented by selectable and/or configurable visual elements on the user interface.

The integration and delivery platform may further build the CI/CD pipeline by at least arranging, via the user interface, the selected one or more pre-built stages. Arranging the selected one or more pre-built stages includes receiving, via the user interface, a user input causing the selected one or more pre-built stages to be dragged from a first portion of the user interface to a second portion of the user interface. As described herein, the CI/CD pipeline may be configured in the second portion of the user interface by, for example, dragging and dropping the selected one or more pre-built stages into an arrangement defining the CI/CD pipeline. In some embodiments, arranging the selected one or more pre-built stages includes adding one or more pre-built stages from the first portion to the second portion of the user interface, reordering the one or more pre-built stages at the second portion of the user interface, configuring a property of the selected one or more pre-built stages, and/or removing the one or more pre-built stages from the second portion of the user interface. Accordingly, the integration and delivery platform may build the CI/CD pipeline with limited coding requirements on the user. In other words, the integration and delivery platform provides a low code no code approach for building the CI/CD pipeline.

In some embodiments, the integration and delivery platform generates, based on the arranged one or more pre-built stages, a recommendation for re-arranging the selected one or more pre-built stages to improve the CI/CD pipeline. For example, the integration and delivery platform may display, via the user interface, a suggestion for rearranging the selected and arranged pre-built stages. The suggestion may improve the efficiency of executing the CI/CD pipeline.

At 2206, the integration and delivery platform may, based on the one or more input values and the arranged one or more pre-built stages, execute the built CI/CD pipeline to develop the software application. The integration and delivery platform may execute the CI/CD pipeline by at least retrieving, from a database in communication with the integration and delivery platform, code for each of the arranged one or more pre-built stages. The integration and delivery platform may execute the retrieved code for each of the arranged one or more pre-built stages according to the arrangement of the CI/CD pipeline. The built CI/CD pipeline may further be executed by at least providing the one or more input values to the code for each of the arranged one or more pre-built stages. Accordingly, the integration and delivery platform provides a low code no code approach for executing the CI/CD pipeline, with minimal coding requirements on the user.

As described herein, the integration and delivery platform provides an end to end solution for software application development. In addition to building and executing the CI/CD pipeline, the integration and delivery platform may test the software application based on the arranged one or more pre-built stages of the CI/CD pipeline, such as by executing the CI/CD pipeline. The integration and delivery platform may generate and/or display a first visual representation of a status of the testing of each of the arranged one or more pre-built stages of the CI/CD pipeline. In some embodiments, the integration and delivery platform generates and/or displays a second visual representation of a status of the overall software development. In this way, the integration and delivery platform monitors the progress of software application development, building, testing, and deployment, and provides end to end updates.

Additionally and/or alternatively, the integration and delivery platform provides value stream mapping for the development of the software application. For example, the integration and delivery platform may receive, such as via the user interface, a selection of a value stream mapping template for development of the software application. The integration and delivery platform may generate a value stream mapping or map based at least one the selected value stream mapping template and the one or more input values. The value stream mapping or map indicates a timeline for developing the software application and may help to identify bottlenecks in the software application development, leading to an improvement in the efficiency of the development of the software application.

Additionally and/or alternatively, the integration and delivery platform provides a low code no code approach to building an architecture diagram for the software application and/or CI/CD pipeline. For example, the integration and delivery platform may receive an image of an architecture representing at least a portion of the software application. The integration and delivery platform may generate an architecture diagram based on the image by, for example, applying one or more image conversion techniques. This improves the efficiency and reduces the computational resources for generating the architecture diagram. The architecture diagram may represent the architecture for display via the client device.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising at least one data processor; and at least one memory result in operations comprising: receiving, by an integration and delivery platform via a user interface displayed at a client device, a request to build an integration and delivery pipeline for developing a software application, wherein the request includes one or more input values for the integration and delivery pipeline; building, by the integration and delivery platform, the integration and delivery pipeline by at least: receiving, via the user interface, a selection of one or more pre-built stages from a plurality of pre-built stages of the integration and delivery pipeline; and arranging, via the user interface, the selected one or more pre-built stages; and executing, by the integration and delivery platform and based on the one or more input values and the arranged one or more pre-built stages, the built integration and delivery pipeline to develop the software application by at least: retrieving, from a database in communication with the integration and delivery platform, code for each of the arranged one or more pre-built stages.

Example 2: The system of example 1, wherein the operations further comprise: generating, by the integration and delivery platform and based on the arranged one or more pre-built stages, a recommendation for re-arranging the selected one or more pre-built stages for improving the integration and delivery pipeline.

Example 3: The system of any one of examples 1 to 2, wherein the arranging includes receiving, via the user interface, a user input causing the selected one or more pre-built stages to be dragged from a first portion of the user interface to a second portion of the user interface.

Example 4: The system of any one of examples 1 to 3, wherein the arranging further includes: adding one or more pre-built stages from the first portion to the second portion of the user interface, reordering the one or more pre-built stages at the second portion of the user interface, configuring a property of the selected one or more pre-built stages, and/or removing the one or more pre-built stages from the second portion of the user interface.

Example 5: The system of any one of examples 1 to 4, wherein the built integration and delivery pipeline is further executed by at least: providing the one or more input values to the code for each of the arranged one or more pre-built stages.

Example 6: The system of any one of examples 1 to 5, wherein the operations further comprise: testing, by the integration and delivery platform, the software application based on the arranged one or more pre-built stages of the integration and delivery pipeline; and generating, by the integration and delivery platform, a first visual representation of a status of the testing of each of the arranged one or more pre-built stages of the integration and delivery pipeline; and generating, by the integration and delivery platform, a second visual representation of the development of the software application.

Example 7: The system of any one of examples 1 to 6, wherein the operations further comprise: receiving, by the integration and delivery platform, selection of a value stream mapping template for development of the software application; and generating, by the integration and delivery platform, a value stream mapping based at least on the selected value stream mapping template and the one or more input values, wherein the value stream mapping indicates a timeline for developing the software application.

Example 8: The system of any one of examples 1 to 7, wherein the operations further comprise: receiving, by the integration and delivery platform, an image of an architecture representing at least a portion of the software application; and generating, by the integration and delivery platform and based on based on the image, an architecture diagram representing the architecture for display via the client device.

Example 9: A computer-implemented method, comprising: receiving, by an integration and delivery platform via a user interface displayed at a client device, a request to build an integration and delivery pipeline for developing a software application, wherein the request includes one or more input values for the integration and delivery pipeline; building, by the integration and delivery platform, the integration and delivery pipeline by at least: receiving, via the user interface, a selection of one or more pre-built stages from a plurality of pre-built stages of the integration and delivery pipeline; and arranging, via the user interface, the selected one or more pre-built stages; and executing, by the integration and delivery platform and based on the one or more input values and the arranged one or more pre-built stages, the built integration and delivery pipeline to develop the software application by at least: retrieving, from a database in communication with the integration and delivery platform, code for each of the arranged one or more pre-built stages.

Example 10: The method of example 9, further comprising: generating, by the integration and delivery platform and based on the arranged one or more pre-built stages, a recommendation for re-arranging the selected one or more pre-built stages for improving the integration and delivery pipeline.

Example 11: The method of any one of examples 9 to 10, wherein the arranging includes receiving, via the user interface, a user input causing the selected one or more pre-built stages to be dragged from a first portion of the user interface to a second portion of the user interface.

Example 12: The method of any one of examples 9 to 11, wherein the arranging further includes: adding one or more pre-built stages from the first portion to the second portion of the user interface, reordering the one or more pre-built stages at the second portion of the user interface, configuring a property of the selected one or more pre-built stages, and/or removing the one or more pre-built stages from the second portion of the user interface.

Example 13: The method of any one of examples 9 to 12, wherein the built integration and delivery pipeline is further executed by at least: providing the one or more input values to the code for each of the arranged one or more pre-built stages.

Example 14: The method of any one of examples 9 to 13, further comprising: testing, by the integration and delivery platform, the software application based on the arranged one or more pre-built stages of the integration and delivery pipeline; and generating, by the integration and delivery platform, a first visual representation of a status of the testing of each of the arranged one or more pre-built stages of the integration and delivery pipeline; and generating, by the integration and delivery platform, a second visual representation of the development of the software application.

Example 15: The method of any one of examples 9 to 14, further comprising: receiving, by the integration and delivery platform, selection of a value stream mapping template for development of the software application; and generating, by the integration and delivery platform, a value stream mapping based at least on the selected value stream mapping template and the one or more input values, wherein the value stream mapping indicates a timeline for developing the software application.

Example 16: The method of any one of examples 9 to 15, further comprising: receiving, by the integration and delivery platform, an image of an architecture representing at least a portion of the software application; and generating, by the integration and delivery platform and based on based on the image, an architecture diagram representing the architecture for display via the client device.

Example 17: A non-transitory computer-readable medium storing instructions, which when executed by at least one data processor, result in operations comprising: receiving, by an integration and delivery platform via a user interface displayed at a client device, a request to build an integration and delivery pipeline for developing a software application, wherein the request includes one or more input values for the integration and delivery pipeline; building, by the integration and delivery platform, the integration and delivery pipeline by at least: receiving, via the user interface, a selection of one or more pre-built stages from a plurality of pre-built stages of the integration and delivery pipeline; and arranging, via the user interface, the selected one or more pre-built stages; and executing, by the integration and delivery platform and based on the one or more input values and the arranged one or more pre-built stages, the built integration and delivery pipeline to develop the software application by at least: retrieving, from a database in communication with the integration and delivery platform, code for each of the arranged one or more pre-built stages.

Example 18: The non-transitory computer-readable medium of example 17 wherein the operations further comprise: generating, by the integration and delivery platform and based on the arranged one or more pre-built stages, a recommendation for re-arranging the selected one or more pre-built stages for improving the integration and delivery pipeline.

Example 19: The non-transitory computer-readable medium of any one of examples 17 to 18, wherein the arranging includes receiving, via the user interface, a user input causing the selected one or more pre-built stages to be dragged from a first portion of the user interface to a second portion of the user interface.

Example 20: The non-transitory computer-readable medium of any one of examples 17 to 19, wherein the arranging further includes: adding one or more pre-built stages from the first portion to the second portion of the user interface, reordering the one or more pre-built stages at the second portion of the user interface, configuring a property of the selected one or more pre-built stages, and/or removing the one or more pre-built stages from the second portion of the user interface.

Figure 23:
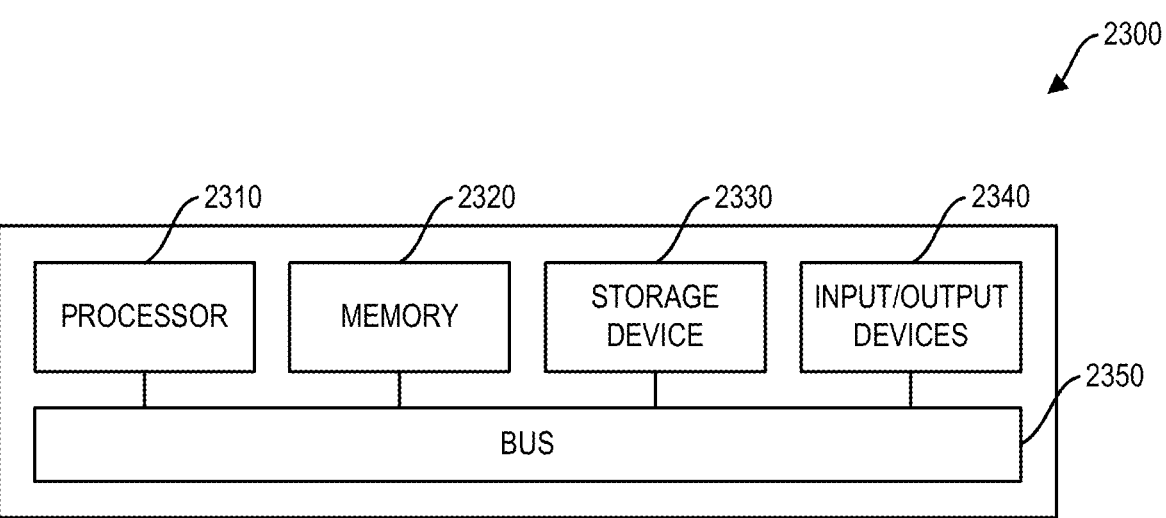
FIG. 23 depicts a block diagram illustrating an example of a computing system, in accordance with some example embodiments.

FIG. 23 depicts a block diagram illustrating a computing system 2300, in accordance with some example embodiments. Referring to FIGS. 1-22, the computing system 2300 can be used to implement the continuous integration/continuous delivery (CI/CD) platform 145, the CI/CD engine 110, the CI/CD system 100, and/or any components therein.

As shown in FIG. 23, the computing system 2300 can include a processor 2310, a memory 2320, a storage device 2330, and an input/output device 2340. The processor 2310, the memory 2320, the storage device 2330, and the input/output device 2340 can be interconnected via a system bus 2350. The processor 2310 is capable of processing instructions for execution within the computing system 2300. Such executed instructions can implement one or more components of, for example, the continuous integration/continuous delivery (CI/CD) platform 145, the CI/CD engine 110, the CI/CD system 100, and/or any components therein. In some implementations of the current subject matter, the processor

2310 can be a single-threaded processor. Alternately, the processor 2310 can be a multi-threaded processor. The processor 2310 is capable of processing instructions stored in the memory 2320 and/or on the storage device 2330 to display graphical information for a user interface provided via the input/output device 2340.

The memory 2320 is a computer readable medium such as volatile or non-volatile that stores information within the computing system 2300. The memory 2320 can store data structures representing configuration object databases, for example. The storage device 2330 is capable of providing persistent storage for the computing system 2300. The storage device 2330 can be a floppy disk device, a hard disk device, an optical disk device, or a tape device, or other suitable persistent storage means. The input/output device 2340 provides input/output operations for the computing system 2300. In some implementations of the current subject matter, the input/output device 2340 includes a keyboard and/or pointing device. In various implementations, the input/output device 2340 includes a display unit for displaying graphical user interfaces.

According to some implementations of the current subject matter, the input/output device 2340 can provide input/output operations for a network device. For example, the input/output device 2340 can include Ethernet ports or other networking ports to communicate with one or more wired and/or wireless networks (e.g., a local area network (LAN), a wide area network (WAN), the Internet).

In some implementations of the current subject matter, the computing system 2300 can be used to execute various interactive computer software applications that can be used for organization, analysis and/or storage of data in various (e.g., tabular) format (e.g., Microsoft Excel®, and/or any other type of software). Alternatively, the computing system 2300 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 2340. The user interface can be generated and presented to a user by the computing system 2300 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

23
24

What is claimed is:

1. A system, comprising:

at least one data processor; and at least one memory result in operations comprising:

receiving, by an integration and delivery platform via a user interface displayed at a client device, a request to build an integration and delivery pipeline for developing a software application, wherein the request includes one or more input values for the integration and delivery pipeline;

building, by the integration and delivery platform, the integration and delivery pipeline by at least receiving, via the user interface, a selection of one or more pre-built stages from a plurality of pre-built stages of the integration and delivery pipeline, and arranging, via the user interface, the selected one or more pre-built stages;

executing, by the integration and delivery platform and based on the one or more input values and the arrangement of the selected one or more pre-built stages, the built integration and delivery pipeline to develop the software application by at least retrieving, from a database in communication with the integration and delivery platform, code for each of the selected one or more pre-built stages;

generating, by the integration and delivery platform and based on the arrangement of the selected one or more pre-built stages, a recommendation for at least one alternative arrangement of the selected one or more pre-built stages for improving the integration and delivery pipeline, wherein the recommendation comprises an estimated time saving for implementing the at least one alternative arrangement of the selected one or more pre-built stages;

testing by the integration and delivery platform, the software application based on the at least one alternative arrangement of the selected one or more pre-built stages; and generating, by the integration and delivery platform, a first visual representation of a status of the testing of the software application and a second visual representation of the development of the software application respectively.

2. The system of claim 1, wherein the arranging includes receiving, via the user interface, a user input causing the selected one or more pre-built stages to be dragged from a first portion of the user interface to a second portion of the user interface.

3. The system of claim 2, wherein the arranging further includes: adding the selected one or more pre-built stages from the first portion to the second portion of the user interface, reordering the selected one or more pre-built stages at the second portion of the user interface, configuring a property of the selected one or more pre-built stages, and/or removing the selected one or more pre-built stages from the second portion of the user interface.

4. The system of claim 1, wherein the built integration and delivery pipeline is further executed by at least: providing the one or more input values to the code for each of the arranged one or more pre-built stages.

5. The system of claim 1, wherein the operations further comprise: receiving, by the integration and delivery platform, selection of a value stream mapping template for the development of the software application; and generating, by the integration and delivery platform, a value stream mapping based at least on the selected value stream mapping template and the one or more input values, wherein the value stream mapping indicates a timeline for the development of the software application.

6. The system of claim 1, wherein the operations further comprise: receiving, by the integration and delivery platform, an image of an architecture representing at least a portion of the software application; and generating, by the integration and delivery platform and based on based on the image, an architecture diagram representing the architecture for display via the client device.

7. A computer-implemented method, comprising:

receiving, by an integration and delivery platform via a user interface displayed at a client device, a request to build an integration and delivery pipeline for developing a software application, wherein the request includes one or more input values for the integration and delivery pipeline;

building, by the integration and delivery platform, the integration and delivery pipeline by at least receiving, via the user interface, a selection of one or more pre-built stages from a plurality of pre-built stages of the integration and delivery pipeline, and arranging, via the user interface, the selected one or more pre-built stages;

executing, by the integration and delivery platform and based on the one or more input values and the arrangement of the selected one or more pre-built stages, the built integration and delivery pipeline to develop the software application by at least retrieving, from a database in communication with the integration and delivery platform, code for each of the selected one or more pre-built stages;

generating, by the integration and delivery platform and based on the arrangement of the selected one or more pre-built stages, a recommendation for at least one alternative arrangement of the selected one or more pre-built stages for improving the integration and delivery pipeline, wherein the recommendation comprises an estimated time saving for implementing the at least one alternative arrangement of the selected one or more pre-built stages;

testing, by the integration and delivery platform, the software application based on the at least one alternative arrangement of the selected one or more pre-built stages; and generating, by the integration and delivery platform, a first visual representation of a status of the testing of the software application and a second visual representation of the development of the software application respectively.

8. The method of claim 7, wherein the arranging includes receiving, via the user interface, a user input causing the selected one or more pre-built stages to be dragged from a first portion of the user interface to a second portion of the user interface.

9. The method of claim 8, wherein the arranging further includes: adding the selected one or more pre-built stages from the first portion to the second portion of the user interface, reordering the selected one or more pre-built stages at the second portion of the user interface, configuring a property of the selected one or more pre-built stages, and/or removing the selected one or more pre-built stages from the second portion of the user interface.

10. The method of claim 7, wherein the built integration and delivery pipeline is further executed by at least: providing the one or more input values to the code for each of the arranged one or more pre-built stages.

11. The method of claim 7, further comprising: receiving, by the integration and delivery platform, selection of a value stream mapping template for the development of the software application; and generating, by the integration and delivery platform, a value stream mapping based at least on the selected value stream mapping template and the one or more input values, wherein the value stream mapping indicates a timeline for the development of the software application.

12. The method of claim 7, further comprising: receiving, by the integration and delivery platform, an image of an architecture representing at least a portion of the software application; and generating, by the integration and delivery platform and based on based on the image, an architecture diagram representing the architecture for display via the client device.

13. A non-transitory computer-readable medium storing instructions, which when executed by at least one data processor, result in operations comprising:

receiving, by an integration and delivery platform via a user interface displayed at a client device, a request to build an integration and delivery pipeline for developing a software application, wherein the request includes one or more input values for the integration and delivery pipeline;

building, by the integration and delivery platform, the integration and delivery pipeline by at least receiving, via the user interface, a selection of one or more pre-built stages from a plurality of pre-built stages of the integration and delivery pipeline, and arranging, via the user interface, the selected one or more pre-built stages;

executing, by the integration and delivery platform and based on the one or more input values and the arrangement of the selected one or more pre-built stages, the built integration and delivery pipeline to develop the software application by at least retrieving, from a database in communication with the integration and delivery platform, code for each of the selected one or more pre-built stages;

generating, by the integration and delivery platform and based on the arrangement of the selected one or more pre-built stages, a recommendation for at least one alternative arrangement of the selected one or more pre-built stages for improving the integration and delivery pipeline, wherein the recommendation comprises an estimated time saving for implementing the at least one alternative arrangement of the selected one or more pre-built stages;

testing, by the integration and delivery platform, the software application based on the at least one alternative arrangement of the selected one or more pre-built stages; and generating, by the integration and delivery platform, a first visual representation of a status of the testing of the software application and a second visual representation of the development of the software application respectively.

14. The non-transitory computer-readable medium of claim 13, wherein the arranging includes receiving, via the user interface, a user input causing the selected one or more pre-built stages to be dragged from a first portion of the user interface to a second portion of the user interface.

15. The non-transitory computer-readable medium of claim 14, wherein the arranging further includes: adding the selected one or more pre-built stages from the first portion to the second portion of the user interface, reordering the selected one or more pre-built stages at the second portion of the user interface, configuring a property of the selected one or more pre-built stages, and/or removing the selected one or more pre-built stages from the second portion of the user interface.

* * * * *